US012539235B2

(12) United States Patent
Klein et al.

(10) Patent No.: US 12,539,235 B2
(45) Date of Patent: Feb. 3, 2026

(54) BIOLOGICAL FLUID SHUNT DEVICES AND METHODS

(71) Applicant: W. L. Gore & Associates, Inc., Newark, DE (US)

(72) Inventors: Jeffrey A. Klein, Newark, DE (US); Jesse R. McAlister, Newark, DE (US); Kevin M. Savory, Newark, DE (US); Timothy M. Schrader, Newark, DE (US); Jeffrey C. Towler, Wilmington, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 377 days.

(21) Appl. No.: 18/127,831

(22) Filed: Mar. 29, 2023

(65) Prior Publication Data

US 2023/0310211 A1    Oct. 5, 2023

Related U.S. Application Data

(60) Provisional application No. 63/324,777, filed on Mar. 29, 2022.

(51) Int. Cl.
*A61F 9/007* (2006.01)
*A61M 25/00* (2006.01)

(52) U.S. Cl.
CPC . *A61F 9/00781* (2013.01); *A61M 2025/0004* (2013.01)

(58) Field of Classification Search
CPC ........ A61F 9/00781; A61F 2250/0039; A61M 2025/0004
See application file for complete search history.

(56) References Cited

U.S. PATENT DOCUMENTS 4,554,918 A * 11/1985 White ................. A61F 9/00781
604/10
4,729,761 A * 3/1988 White ..................... A61F 9/007
604/8

(Continued)

FOREIGN PATENT DOCUMENTS

| EP | 3706653 A1 | 9/2020 |
|---|---|---|
| WO | 2014/130574 A1 | 8/2014 |
| WO | 2019/094004 A1 | 5/2019 |

OTHER PUBLICATIONS

D'Alessandro et al., "XEN-augmented Baerveldt: A New Surgical Technique for Refractory Glaucoma", Journal of Glaucoma, vol. 26, No. 2, Feb. 2017, pp. e90-e92.

(Continued)

*Primary Examiner* — Adam Marcetich
(74) *Attorney, Agent, or Firm* — Nelson Mullins Riley & Scarbourough LLP

(57) ABSTRACT

A glaucoma shunt device is provided for draining a biological fluid from an eye. The glaucoma shunt device includes a primary tube, a secondary tube, and a shunt body. The primary tube has a primary proximal end, a primary distal end, and a primary conduit extending therebetween. The secondary tube has a secondary proximal end, a secondary distal end, and a secondary conduit extending therebetween. The secondary tube is at least partially inserted through the primary conduit via the primary distal end. The secondary tube defines a flow resistance of the primary and secondary tubes. The shunt body has a reservoir therein and is integrated with the primary tube near the primary distal end such that the primary and secondary conduits are fluidly coupled with the reservoir.

28 Claims, 16 Drawing Sheets

(56) References Cited

U.S. PATENT DOCUMENTS

| | | | |
|---|---|---|---|
| 5,882,327 A * | 3/1999 | Jacob | A61F 9/00781 604/294 |
| 6,544,249 B1 | 4/2003 | Yu et al. | |
| 2002/0193725 A1* | 12/2002 | Odrich | A61F 9/00781 604/8 |
| 2004/0024345 A1* | 2/2004 | Gharib | A61F 9/00781 623/4.1 |
| 2004/0162545 A1 | 8/2004 | Brown et al. | |
| 2006/0036207 A1 | 2/2006 | Koonmen et al. | |
| 2007/0293872 A1* | 12/2007 | Peyman | A61F 9/00781 606/107 |
| 2012/0123315 A1* | 5/2012 | Horvath | A61F 9/00781 604/8 |
| 2013/0150773 A1* | 6/2013 | Nissan | A61F 9/00781 604/9 |
| 2014/0114226 A1* | 4/2014 | Snyder | A61M 27/002 604/8 |
| 2014/0236066 A1* | 8/2014 | Horvath | A61L 31/08 604/9 |
| 2014/0236067 A1 | 8/2014 | Horvath et al. | |
| 2014/0343476 A1 | 11/2014 | Penhasi | |
| 2016/0067092 A1 | 3/2016 | Lind et al. | |
| 2016/0067093 A1* | 3/2016 | Johnson | A61F 9/00781 604/9 |
| 2016/0242962 A1 | 8/2016 | Torello et al. | |
| 2016/0256320 A1 | 9/2016 | Horvath et al. | |
| 2017/0087016 A1 | 3/2017 | Camras | |
| 2017/0312132 A1 | 11/2017 | Rynerson | |
| 2018/0263819 A1* | 9/2018 | Roeber | A61L 31/048 |
| 2019/0046696 A1 | 2/2019 | Parikh et al. | |
| 2019/0133826 A1 | 5/2019 | Horvath et al. | |
| 2019/0298572 A1* | 10/2019 | Chu | A61F 9/008 |
| 2020/0345550 A1 | 11/2020 | Han et al. | |
| 2022/0387217 A1* | 12/2022 | Argento | A61F 9/00781 |

OTHER PUBLICATIONS

International Search Report and Written Opinion received for PCT Patent Application No. PCT/US2023/016672, mailed on Jul. 19, 2023, 15 pages.

Sng CCA et al., "Caution in Using the XEN-augmented Baerveldt Surgical Technique", Journal of Glaucoma, vol. 26, No. 11, Nov. 2017, e257 page.

Teixeira et al., "Baerveldt-XEN persistent proximal occlusion: solving new problems with old answers", BMJ Case Reports, vol. 2018, Oct. 21, 2018, pp. 1-3.

Teixeira et al., "XEN-augmented Baerveldt surgical success rate and comparison with the Ahmed Valve", Acta Ophthalmological, vol. 98, Issue 7, Mar. 18, 2020, pp. e870-e875.

* cited by examiner

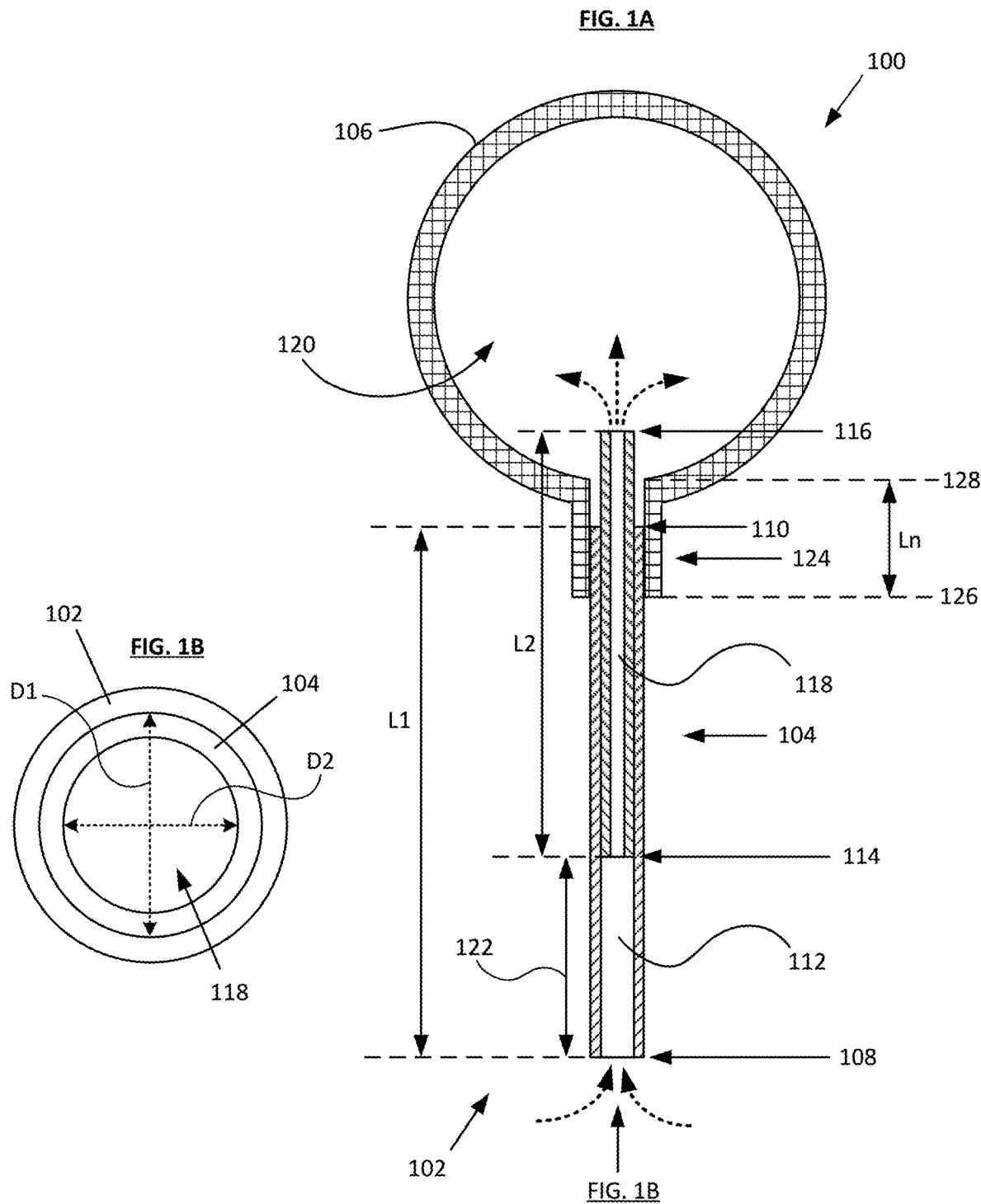

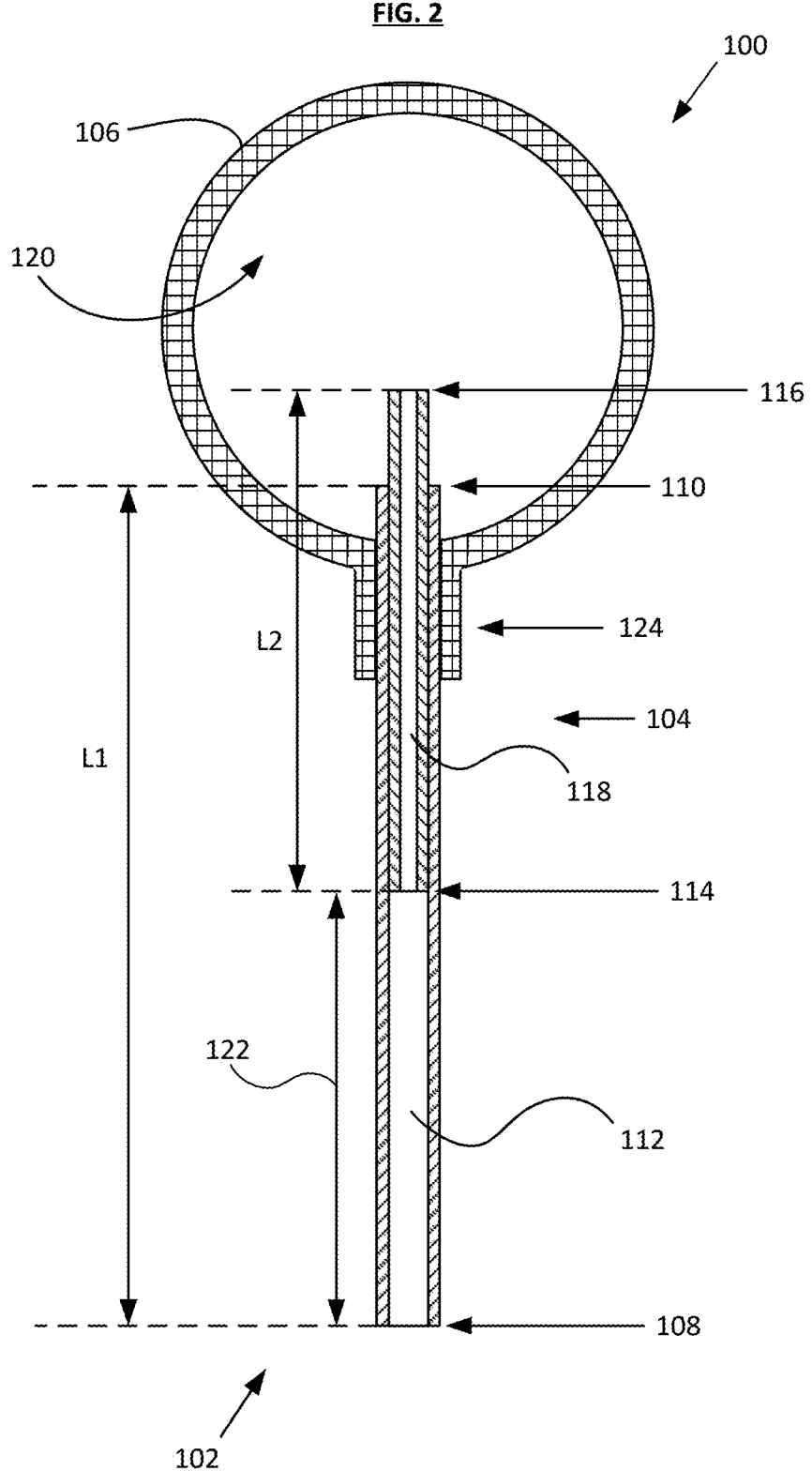

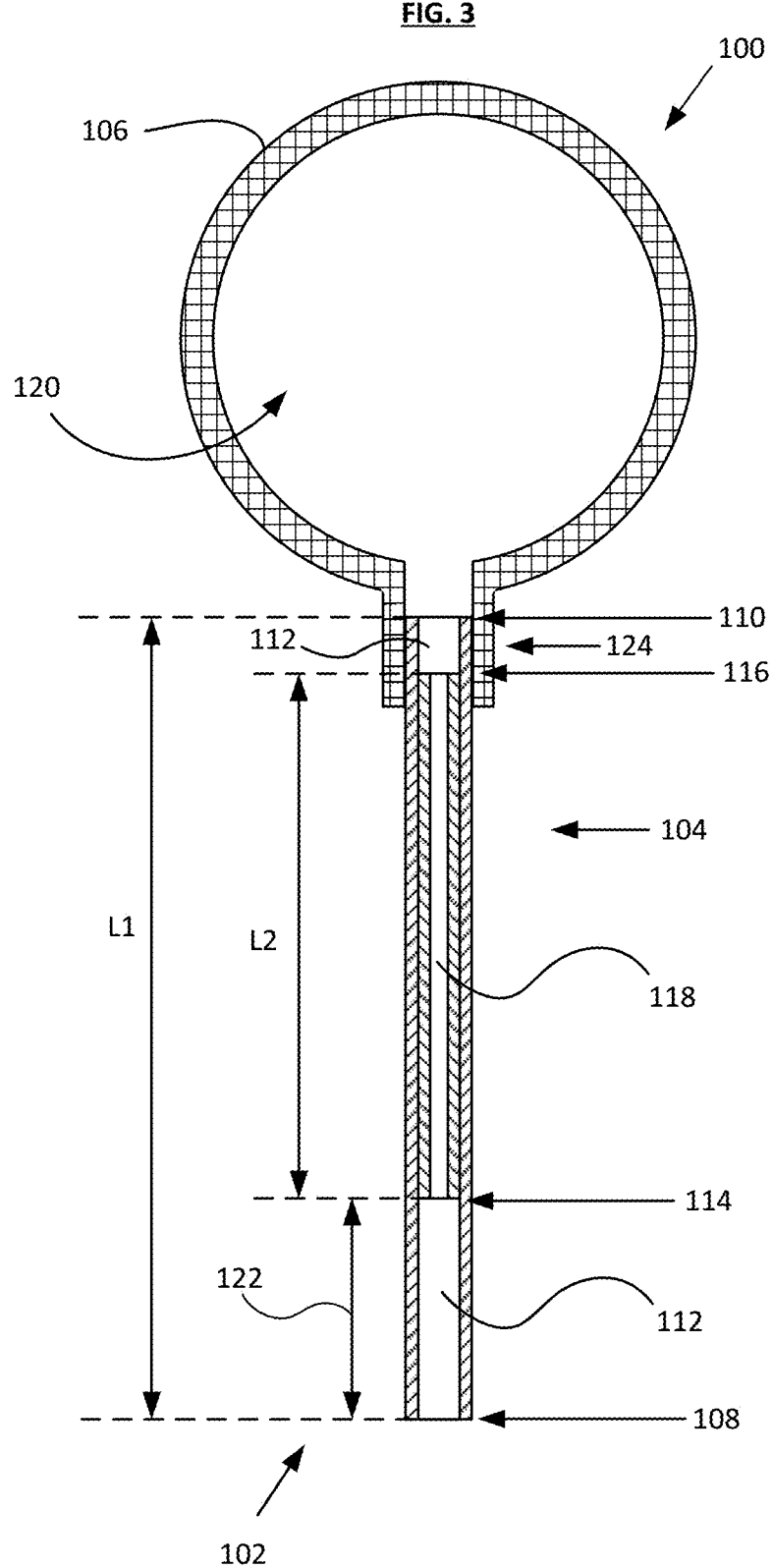

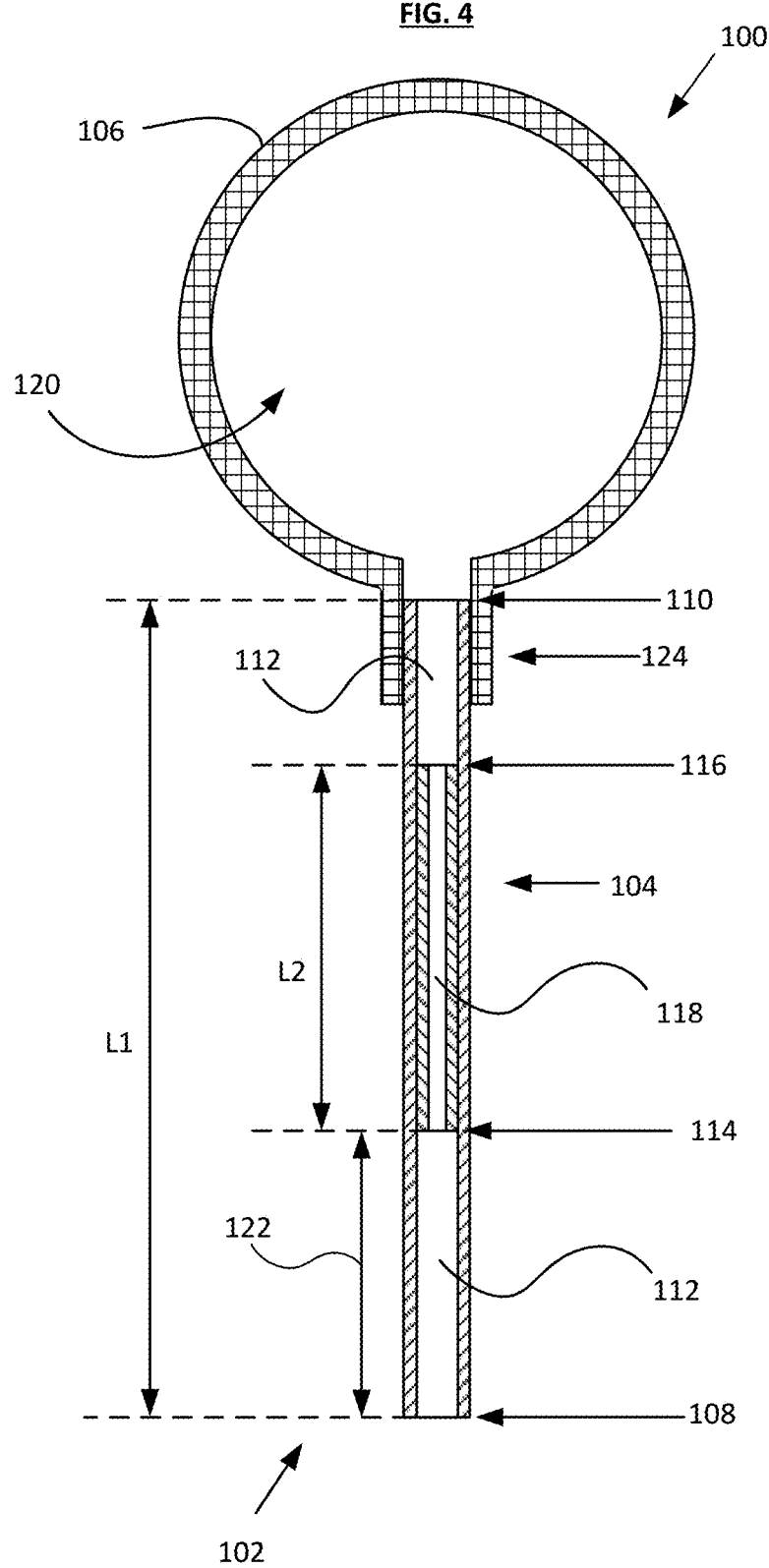

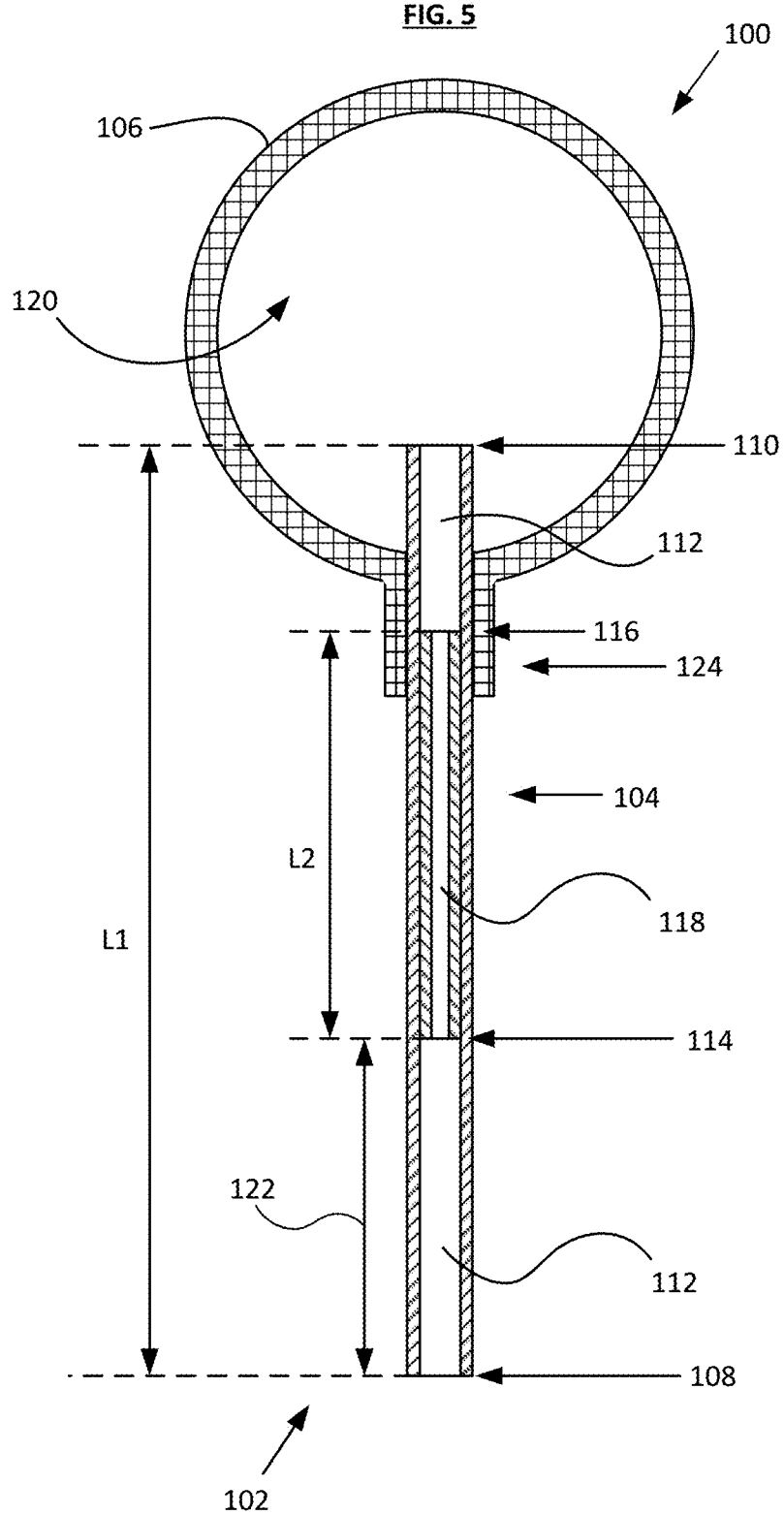

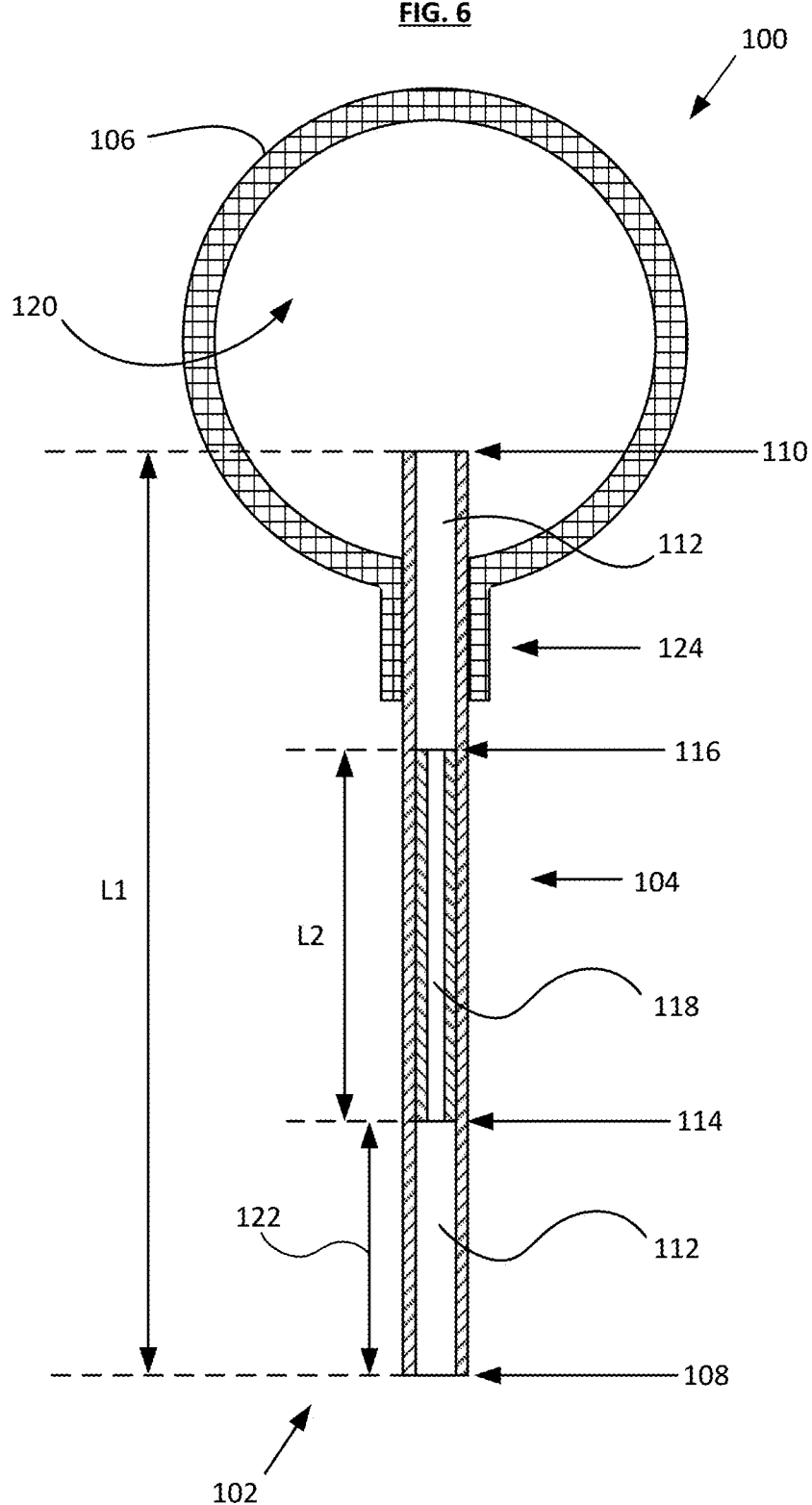

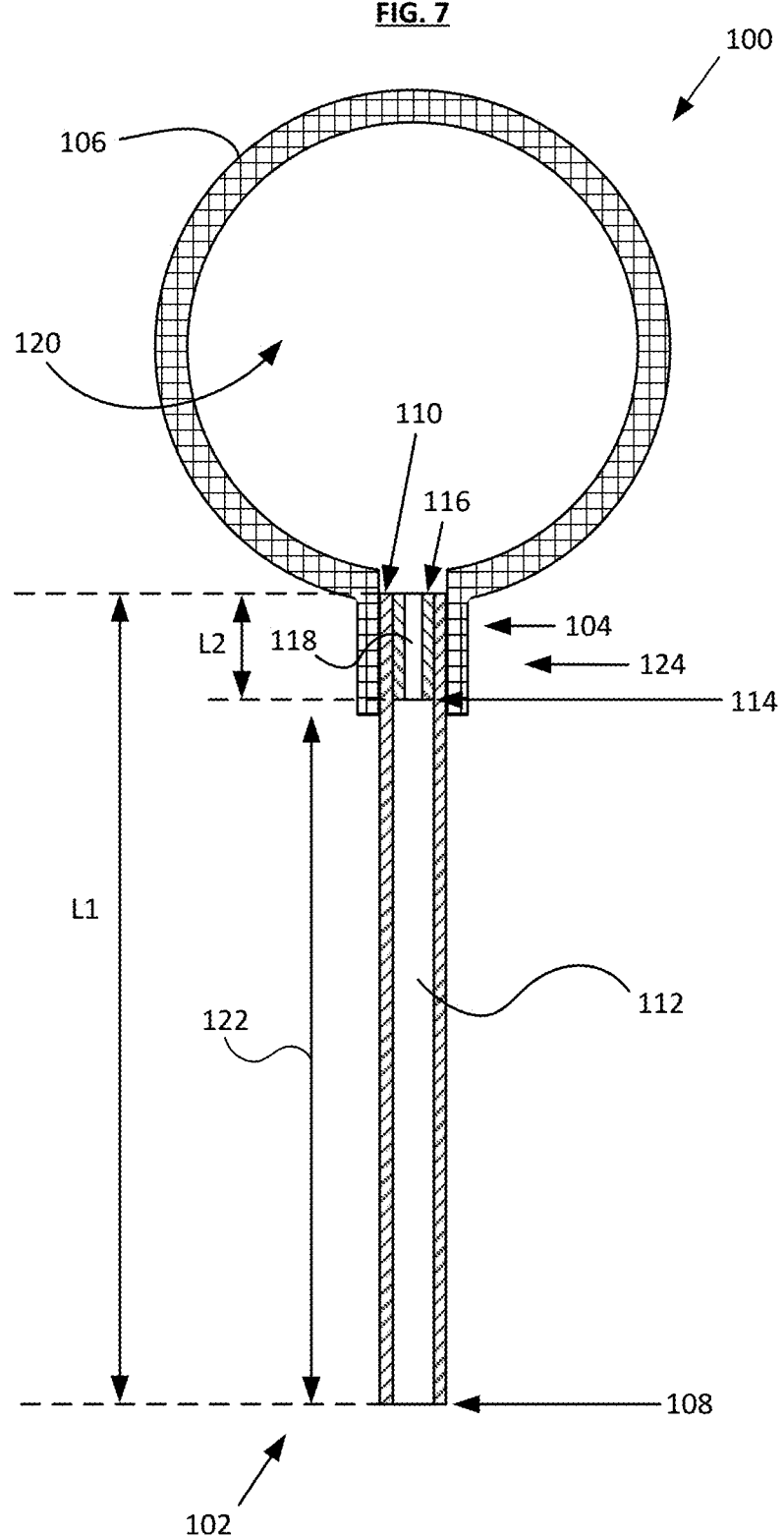

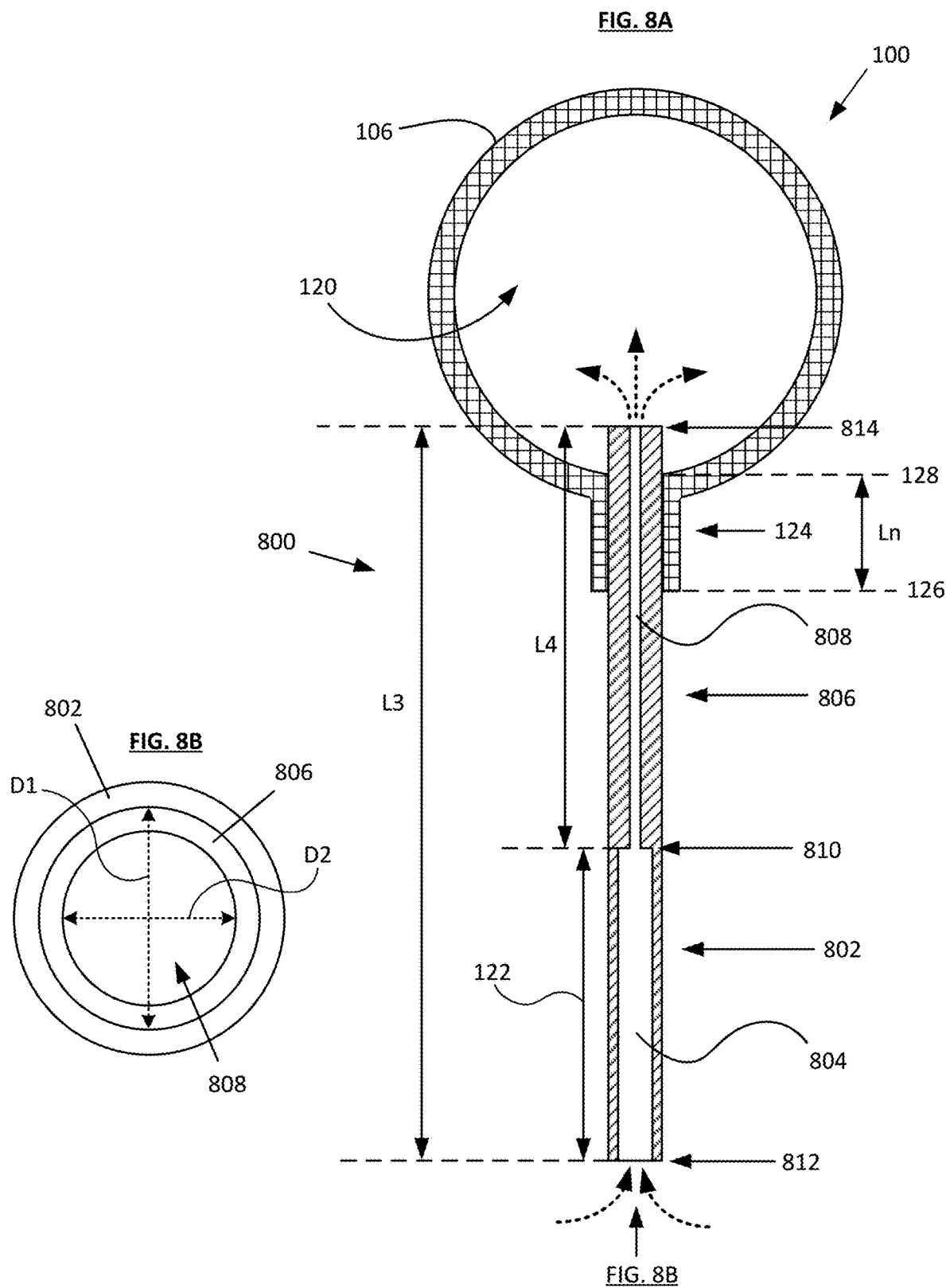

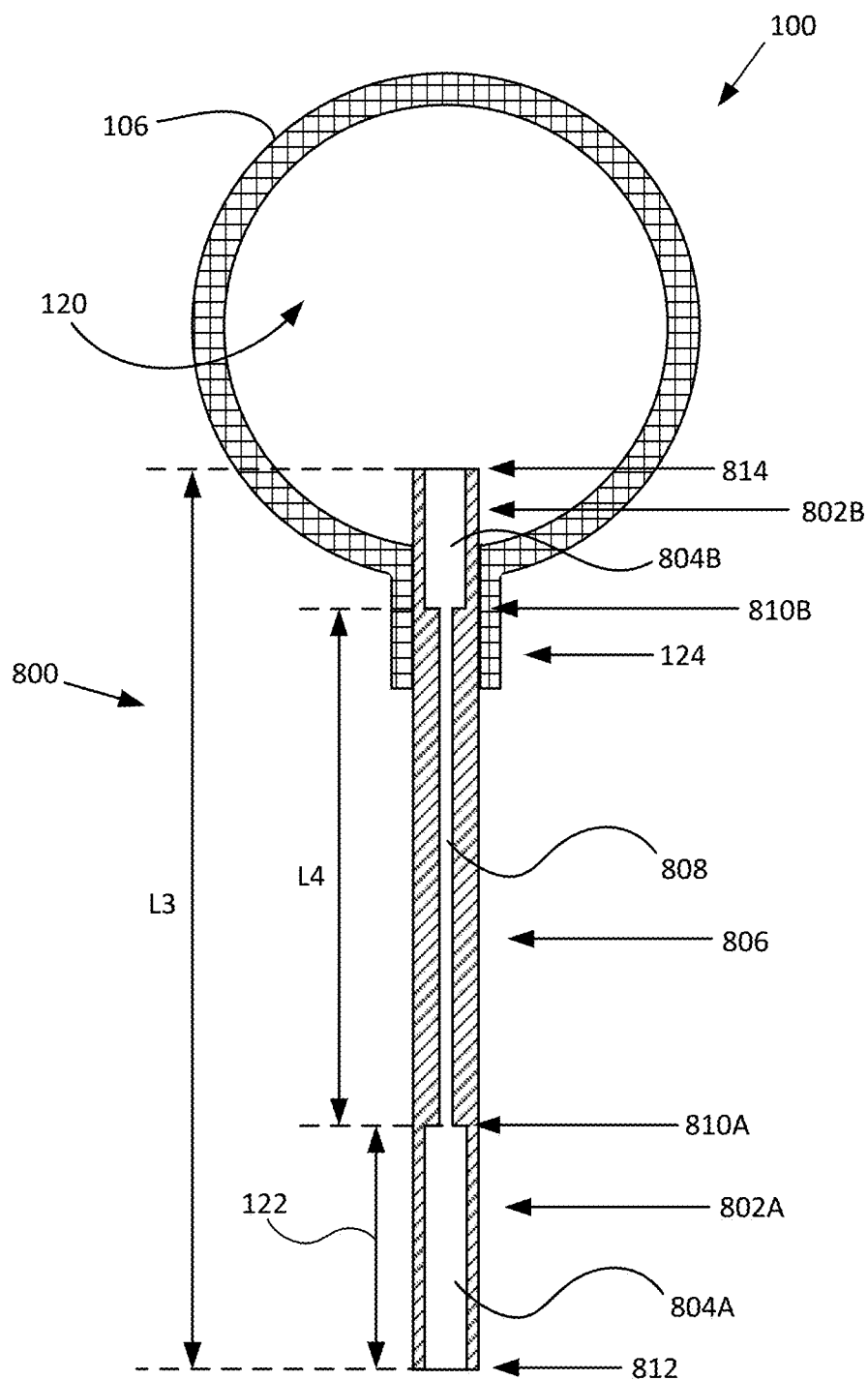

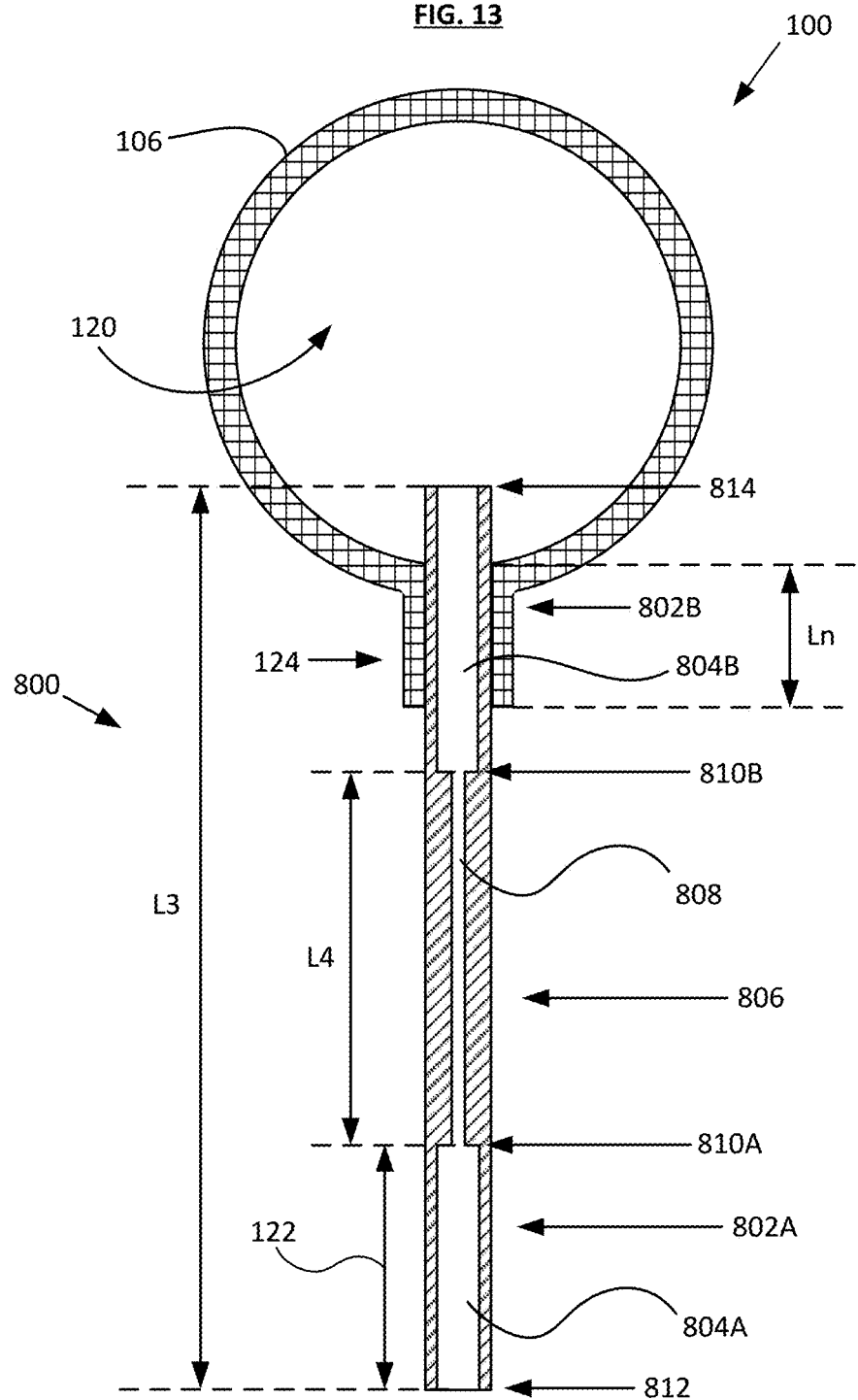

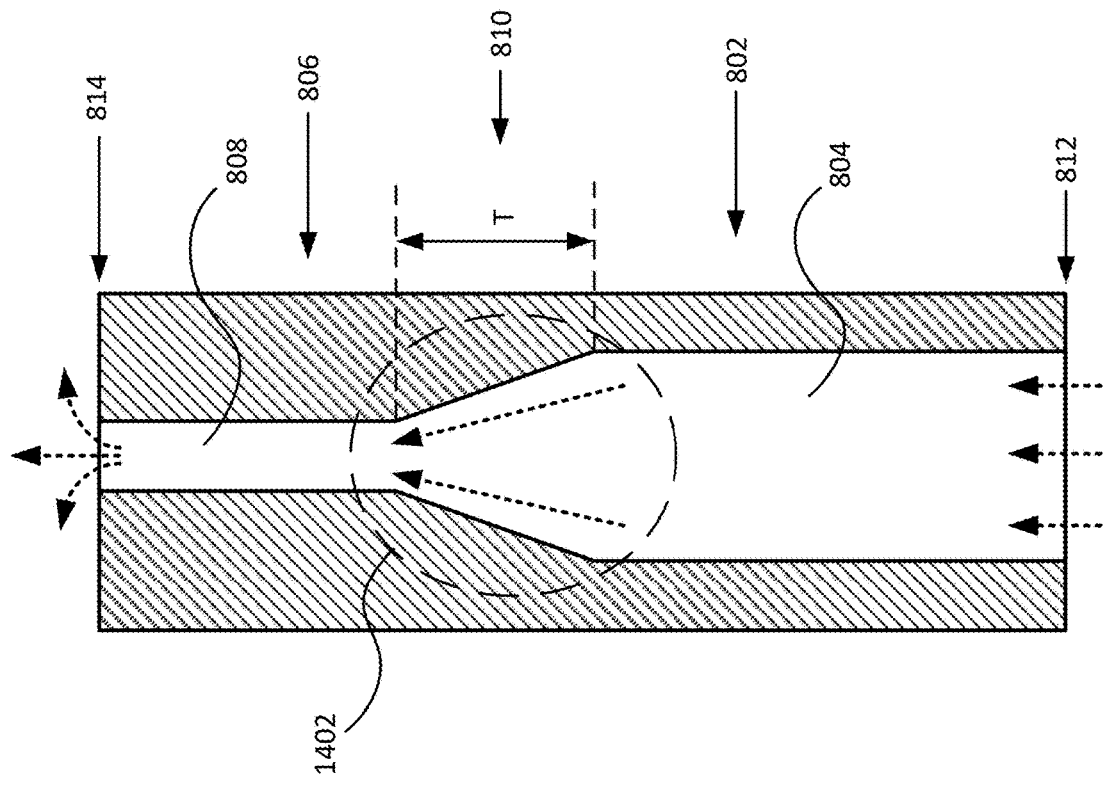
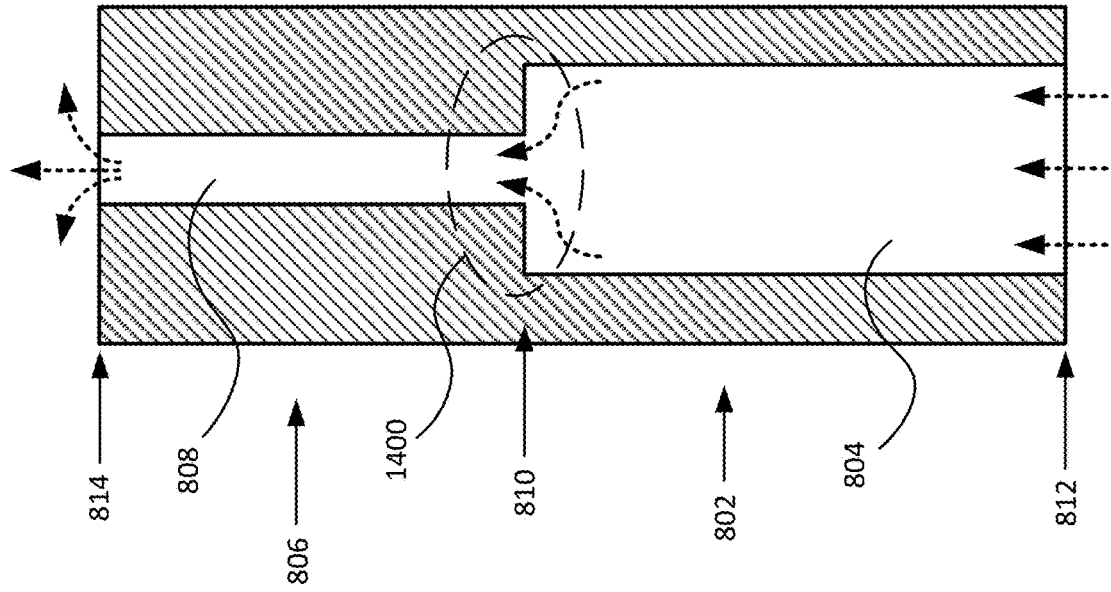

BIOLOGICAL FLUID SHUNT DEVICES AND METHODS

CROSS-REFERENCE TO RELATED APPLICATION

This application claims the benefit of U.S. Provisional Application No. 63/324,777, filed Mar. 29, 2022, which is incorporated herein by reference in its entirety for all purposes.

FIELD OF THE DISCLOSURE

The present disclosure relates generally to apparatuses and methods for draining biological fluid and diverting the fluid to be reabsorbed elsewhere in the body. More specifically, the disclosure relates to apparatuses and methods for draining aqueous humor from an anterior chamber of a patient's eye such that it may be reabsorbed by the body.

BACKGROUND

Various medical interventions involve evacuating excess biological fluid from one portion of the body and redirecting it to another location of the body where it may be reabsorbed. In certain instances, this evacuation is achieved via minimally invasive procedures such as endoscopic third ventriculostomy (ETV) and choroid plexus cauterization procedure (CPC). In other instances, this evacuation is performed post-operatively via implantable medical devices, such as a shunt. Proven useful in various medical procedures, shunts of different forms have been employed as treatment for numerous diseases, such as hydrocephalus and glaucoma.

Without treatment, excessive biological fluid may lead to unhealthy pressure buildups. For instance, glaucoma is a progressive eye disease characterized by elevated intraocular pressure. Aqueous humor is a fluid that fills an anterior chamber (AC) of the eye and contributes to intraocular pressure or intraocular fluid pressure. This increase in intraocular pressure is usually caused by an insufficient amount of aqueous humor absorbed by the body. In some cases, the aqueous humor is not absorbed quickly enough or even not absorbed at all, while in other cases, the aqueous humor is additionally or alternatively produced too quickly. Elevated intraocular pressure is associated with gradual and sometimes permanent loss of vision in the affected eye.

Attempts have been made to treat glaucoma, including devices that are relatively bulky, inflexible, uncompliant, and lack secure anchoring capabilities to surrounding tissue resulting in relative movement between the device and tissue. Such movement may result in continued stimulation of the surrounding tissue, causing irritation at the implantation site. Irritation, in turn, may lead to increased chronic inflammatory tissue response, excessive scarring at the device site, and increased risk of device erosion through conjunctival and endophthalmitis. Scar tissue effectively prevents resorption of aqueous humor without erosion and interferes with device function.

SUMMARY

Disclosed herein are shunt devices for draining a biological fluid from an eye to a tissue surrounding the eye, as well as methods for forming the shunt device that is implantable at least in part within a tissue of an eye and methods for treating a glaucoma using the shunt device.

According to one example ("Example 1"), a glaucoma shunt device is provided for draining a biological fluid from an eye, where the glaucoma shunt device includes: a primary tube, a secondary tube, and a shunt body. The primary tube has a primary proximal end, a primary distal end, and a primary conduit extending therebetween. The secondary tube has a secondary proximal end, a secondary distal end, and a secondary conduit extending therebetween. The secondary tube is at least partially inserted through the primary conduit via the primary distal end. The secondary tube defines a flow resistance of the primary and secondary tubes. The shunt body has a reservoir therein and is integrated with the primary tube near the primary distal end such that the primary and secondary conduits are fluidly coupled with the reservoir.

According to another example ("Example 2") further to Example 1, the secondary tube is permanently attached to the primary tube.

According to another example ("Example 3") further to Example 2, the permanent attachment is facilitated by an adhesive disposed between an outer surface of the secondary tube and an inner surface of the primary conduit.

According to another example ("Example 4") further to Example 2, the permanent attachment is facilitated by a friction fit between an outer surface of the secondary tube and an inner surface of the primary conduit.

According to another example ("Example 5") further to any one of the preceding Examples, the secondary distal end extends distally beyond the primary distal end and into the reservoir.

According to another example ("Example 6") further to any one of Examples 1-4, the shunt body comprises a neck portion where the primary tube is attached to the shunt body.

According to another example ("Example 7") further to Example 6, the primary and secondary distal ends are both positioned at the neck portion of the shunt body.

According to another example ("Example 8") further to Example 6, the primary distal end is positioned at the neck portion of the shunt body and the secondary distal end is positioned proximally with respect to the neck portion.

According to another example ("Example 9") further to Example 6, the primary distal end extends distally beyond the neck portion of the shunt body and into the reservoir, and the secondary distal end is positioned at the neck portion.

According to another example ("Example 10") further to Example 6, the primary distal end extends distally beyond the neck portion of the shunt body and into the reservoir, and the secondary distal end is positioned proximally with respect to the neck portion.

According to another example ("Example 11") further to Example 6, the secondary tube is entirely disposed at or within the neck portion.

According to another example ("Example 12") further to any one of the preceding Examples, the primary tube is permanently attached to the shunt body at or near the primary distal end.

According to another example ("Example 13") further to any one of the preceding Examples, the primary proximal end extends proximally beyond the secondary proximal end by a predetermined length to define a trimmable portion of the primary tube. A total length of the primary tube defines a first state of the combined primary and secondary tubes that is untrimmed and further defines a second state of the combined primary and secondary tubes that is trimmed to a shorter length of the trimmable portion. The first state and the second state both have the same flow resistances.

According to another example ("Example 14") further to Example 13, the secondary conduit maintains a constant flow rate therethrough before and after the primary tube is shortened.

According to another example ("Example 15") further to any one of the preceding Examples, the secondary conduit has a smaller diameter than the primary conduit such that the diameter of the secondary conduit is a primary determinant of a flow resistance of fluid entering the reservoir.

According to another example ("Example 16") further to any one of the preceding Examples, a length of the secondary conduit is a secondary determinant of a flow resistance of fluid entering the reservoir.

According to one example ("Example 17"), a glaucoma shunt device for draining a biological fluid from an eye includes a tube and a shunt body. The tube includes a primary portion with a primary conduit and a secondary portion with a secondary conduit. The primary conduit has a primary diameter greater than a secondary diameter of the secondary conduit. The primary portion is positioned proximally with respect to the secondary portion. The secondary conduit has a flow resistance. The shunt body has a reservoir therein and is integrated with the tube at the secondary portion such that the primary and secondary conduits are fluidly coupled with the reservoir.

According to another example ("Example 18") further to Example 17, a section of the secondary portion extends distally into the reservoir.

According to another example ("Example 19") further to Example 18, the shunt body comprises a neck portion where the tube is attached to the shunt body.

According to another example ("Example 20") further to Example 19, a distal end of the tube is positioned at the neck portion of the shunt body.

According to another example ("Example 21") further to Example 19, the secondary portion of the tube is entirely disposed at or within the neck portion.

According to another example ("Example 22") further to Example 18, the tube includes a proximal primary portion positioned proximally with respect to the secondary portion and partially defining the primary conduit, a distal primary portion positioned distally with respect to the secondary portion and partially defining the primary conduit, a first transitional portion positioned between the proximal primary portion and the secondary portion, and a second transitional portion positioned between the distal primary portion and the secondary portion.

According to another example ("Example 23") further to Example 22, a distal end of the tube is positioned at the neck portion of the shunt body, and the first and second transitional portions are both positioned proximally with respect to the neck portion.

According to another example ("Example 24") further to Example 22, a distal end of the tube extends distally beyond the neck portion of the shunt body and into the reservoir, the second transitional portion is positioned at the neck portion, and the first transitional portion is positioned proximally with respect to the neck portion.

According to another example ("Example 25") further to Example 22, a distal end of the tube extends distally beyond the neck portion of the shunt body and into the reservoir, and the first and second transitional portions are both positioned proximally with respect to the neck portion.

According to another example ("Example 26") further to any one of Examples 17-25, the primary portion extends proximally with respect to the secondary portion by a predetermined length, such that a total length of the tube is capable of being shortened by cutting the primary portion of the tube along a section extending proximally beyond the secondary portion, without affecting the flow resistance of the secondary conduit.

According to another example ("Example 27") further to Example 26, the secondary conduit maintains a constant flow rate therethrough before and after the primary portion of the tube is shortened.

According to another example ("Example 28") further to any one of Examples 17-27, the secondary conduit has a smaller diameter than the primary conduit such that the diameter of the secondary conduit is a primary determinant of a flow resistance of fluid entering the reservoir.

According to another example ("Example 29") further to any one of Examples 17-28, a length of the secondary conduit is a secondary determinant of a flow resistance of fluid entering the reservoir.

According to one example ("Example 30"), a method is disclosed of forming a drainage device implantable at least in part within a tissue of an eye. The method includes: forming a shunt body with a reservoir defined therein, the reservoir being configured to receive and accumulate biological fluid; preparing a primary tube having a primary proximal end, a primary distal end, and a primary conduit extending therebetween and a secondary tube having a secondary proximal end, a secondary distal end, and a secondary conduit extending therebetween and having a flow resistance; at least partially inserting the secondary tube through the primary conduit via the primary distal end; and integrating the shunt body with the primary tube near the primary distal end such that the primary and secondary conduits are fluidly coupled with the reservoir and the primary proximal end of the primary tube is deliverable into the eye to facilitate drainage of the biological fluid into the primary conduit.

According to another example ("Example 31") further to Example 30, the method includes permanently attaching the secondary tube to the primary tube.

According to another example ("Example 32") further to Example 31, the method includes disposing an adhesive between an outer surface of the secondary tube and an inner surface of the primary conduit prior to at least partially inserting the secondary tube through the primary conduit via the primary distal end.

According to another example ("Example 33") further to any one of Examples 30-32, the method includes positioning the secondary distal end to extend distally beyond the primary distal end and into the reservoir.

According to another example ("Example 34") further to any one of Examples 30-33, the method includes permanently attaching the primary tube to the shunt body at or near the primary distal end.

According to another example ("Example 35") further to any one of Examples 30-34, the method includes positioning the primary proximal end to extend proximally beyond the secondary proximal end by a predetermined length, such that a total length of the primary tube is capable of being shortened by cutting the primary tube along a section extending proximally beyond the secondary tube, without affecting the flow resistance of the secondary conduit.

According to another example ("Example 36") further to Example 35, the method includes maintaining, by the secondary conduit, a constant flow rate through the secondary conduit before and after the shortening of the primary tube.

According to another example ("Example 37") further to any one of Examples 30-36, the method includes forming the secondary tube such that the secondary conduit has a smaller diameter than the primary conduit, and the diameter of the secondary conduit is a primary determinant of a flow resistance of fluid entering the reservoir.

According to another example ("Example 38") further to any one of Examples 30-37, a length of the secondary conduit is a secondary determinant of a flow resistance of fluid entering the reservoir.

According to one example ("Example 39"), a method is disclosed of forming a drainage device implantable at least in part within a tissue of an eye. The method includes: forming a shunt body with a reservoir defined therein, the reservoir being configured to receive and accumulate biological fluid; preparing a tube a primary portion with a primary conduit and a secondary portion with a secondary conduit, the primary conduit having a primary diameter greater than a secondary diameter of the secondary conduit, the primary portion positioned proximally with respect to the secondary portion, and the secondary conduit having a flow resistance; and integrating the shunt body with the tube at the secondary portion such that the primary and secondary conduits are fluidly coupled with the reservoir and the primary portion of the primary tube is deliverable into the eye to facilitate drainage of the biological fluid into the primary conduit.

According to another example ("Example 40") further to Example 39, the method includes distally extending the secondary portion of the tube at least partially into the reservoir.

According to another example ("Example 41") further to Example 39 or 40, the method includes forming the tube such that the primary portion extends proximally with respect to the secondary portion by a predetermined length, and a total length of the primary portion is capable of being shortened by cutting the primary portion of the tube along a section extending proximally beyond the secondary portion, without affecting the flow resistance of the secondary conduit.

According to another example ("Example 42") further to Example 41, the method includes maintaining, by the secondary portion, a constant flow rate through the secondary conduit before and after the shortening of the primary portion of the tube.

According to another example ("Example 43") further to any one of Examples 39-42, the method includes forming the tube such that the secondary conduit has a smaller diameter than the primary conduit, and the diameter of the secondary conduit is a primary determinant of a flow resistance of fluid entering the reservoir.

According to another example ("Example 44") further to any one of Examples 39-43, a length of the secondary conduit is a secondary determinant of a flow resistance of fluid entering the reservoir.

According one example ("Example 45"), a method is disclosed of draining a biological fluid from a human eye via a tube extending from a glaucoma shunt body, the tube having a tube proximal end disposed within the human eye to receive the biological fluid and a tube distal end engaging the glaucoma shunt body to fluidically connect the tube proximal end to a reservoir disposed within the glaucoma shunt body. The method includes: channeling the biological fluid through the tube at a first flow resistance at the tube proximal end; channeling the biological fluid through the tube at a second flow resistance between the tube proximal end and the tube distal end, the second flow resistance being greater than the first flow resistance; and channeling the biological fluid from the tube distal end into the reservoir.

According to one example ("Example 46"), a method is disclosed of reducing a fluid pressure in a human eye to lessen a risk of hypotony. The method includes: directing a fluid within the eye into a tube proximal end having a first flow resistance; subsequently directing the fluid into a portion of the tube having a second flow resistance that is greater than the first flow resistance; and subsequently directing the fluid from a tube distal end and into a reservoir.

According to another example ("Example 47") further to Example 45 or 46, the method includes trimming the tube proximal end to reduce a length of the tube while maintaining the second flow resistance.

According to another example ("Example 48") further to any one of Examples 45-47, the first and second flow resistances define a combined tube flow resistance, and the method includes trimming the tube proximal end to reduce a length of the tube while maintaining the combined tube flow resistance.

According to another example ("Example 49") further to any one of Examples 45-48, the tube distal end is disposed to extend into the reservoir.

According to another example ("Example 50") further to any one of Examples 45-49, the method includes immediately after subsequently directing the fluid into a portion of the tube having a second flow resistance, subsequently directing the fluid into another portion of the tube having a third flow resistance that is less than the second flow resistance.

According to one example ("Example 51"), a method is disclosed of reducing a fluid pressure in a human eye to lessen a risk of hypotony. The method includes: directing a fluid within the eye through a tube proximal end and into a reservoir disposed at a different position relative to the tube proximal end. Between the tube proximal end and a tube distal end disposed adjacent to the reservoir, a flow resistance of the tube increases to limit a flow through the tube sufficient enough to lessen the risk of hypotony. The increase of the flow resistance occurs between the tube proximal end and the tube distal end.

According to another example ("Example 52") further to Example 51, the method includes trimming the tube proximal end to reduce a length of the tube while maintaining the flow resistance.

According to another example ("Example 53") further to Example 51 or 52, the tube distal end is disposed to extend into the reservoir.

According to another example ("Example 54") further to any one of Examples 51-53, the flow resistance decreases between the flow resistance increase and the tube distal end.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 1A is a cross-sectional view of a glaucoma shunt device with tubes according to an embodiment disclosed herein;

FIG. 1B is a side view of the glaucoma shunt device of FIG. 1A as seen from one end (proximal end) of the tubes extending from the glaucoma shunt device;

FIGS. 2-7 are cross-sectional views of various glaucoma shunt devices with tubes according to different embodiments disclosed herein;

FIG. 8A is a cross-sectional view of a glaucoma shunt device with a tube according to an embodiment disclosed herein;

FIG. 8B is a side view of the glaucoma shunt device of FIG. 8A as seen from one end (proximal end) of the tube extending from the glaucoma shunt device;

FIGS. 9-13 are cross-sectional views of various glaucoma shunt devices, each with a tube, according to different embodiments disclosed herein; and FIGS. 14A and 14B are cross-sectional view of a portion of the tube showing the transitional portion thereof, according to different embodiments disclosed herein.

Figure 1C:
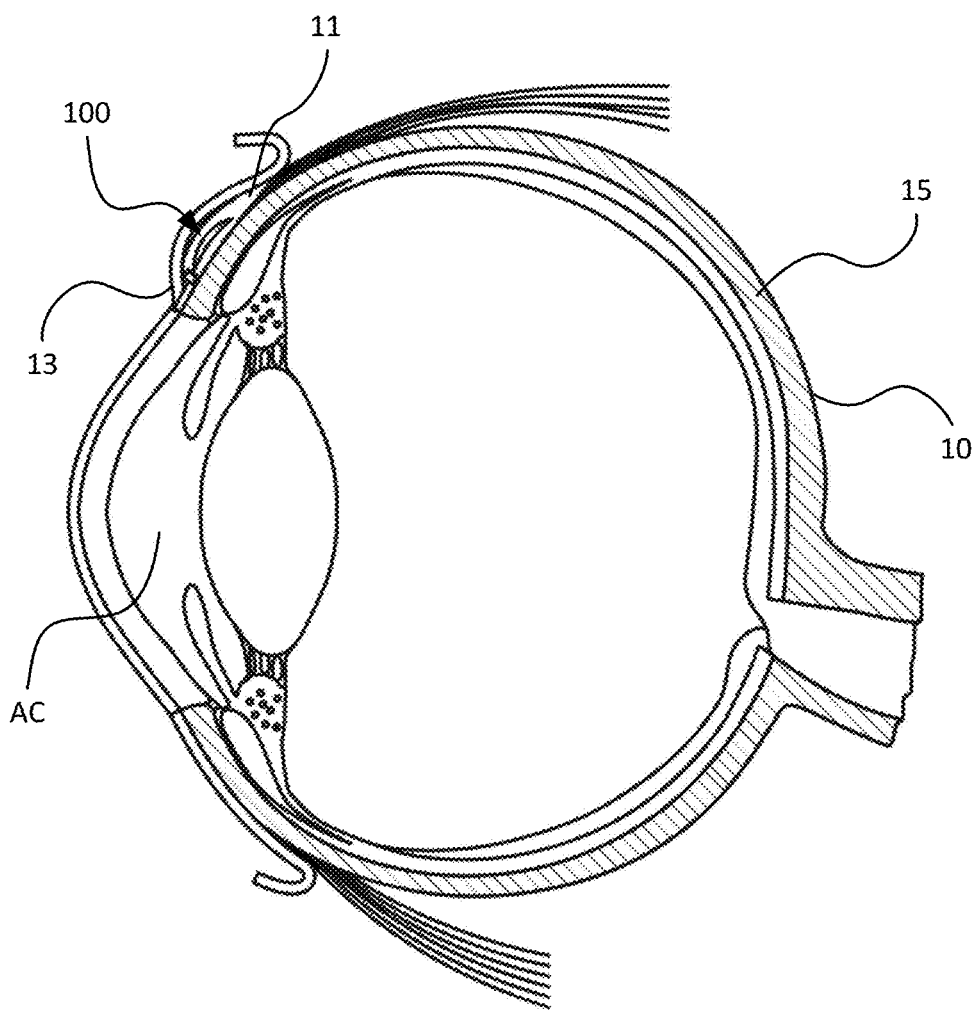
FIG. 1C is a cross-sectional side view of an eye with a shunt device implanted therein consistent with various aspects of the present disclosure.

It should be understood that the drawings and replicas of the photographs are not necessarily to scale. In certain instances, details that are not necessary for an understanding of the disclosure or that render other details difficult to perceive may have been omitted. It should be understood, of course, that the disclosure is not necessarily limited to the particular examples or embodiments illustrated or depicted herein.

DETAILED DESCRIPTION

Definitions and Terminology

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" may be understood to mean plus or minus 10% of the stated value.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

DESCRIPTION OF VARIOUS EMBODIMENTS

Various embodiments address a shunt which can be implanted in the eye to drain such fluid from the AC of an eye and accommodate for means of avoiding or preventing hypotony. However, such shunt merely defines a lumen to redirect the fluid from the AC to a different location with a lower pressure than the AC and therefore does not include any component which redirects the flow of the fluid after it leaves the AC. That is, there is no component in the shunt which accommodates for the fluid when it arrives at the destination, which is the location with the lower pressure than the AC.

Furthermore, such shunt only provides an initial flow restriction during implantation of the shunt. Using a dissolvable plug section, the shunt provides an initial outflow resistance to avoid early low post-operation intraocular pressures and hypotony and subsequently increase in flow over time by lessening the outflow resistance in order to compensate for the rising biological outflow resistance after the operation is complete. As such, the shunt does not provide a long-term means of avoiding or preventing hypotony within the eye.

Persons skilled in the art will readily appreciate that various aspects of the present disclosure may be realized by any number of methods and apparatuses configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

Various features of devices and methods disclosed herein may be seen in the figures. Various aspects of the present disclosure relate to drainage devices and methods for biological fluids. For example, the present disclosure addresses devices and methods for draining aqueous humor from an anterior chamber (AC) of an eye 10 (FIG. 1C) of a patient so that the aqueous humor may be resorbed by the body elsewhere.

FIG. 1C is an illustration of an eye 10 with a subconjunctival space 11 between a conjunctiva 13 and a sclera 15 of the eye 10. Implanted within the eye 10 is a drainage system with a drainage or shunt device 100 in accordance with principles of the present disclosure. In an aspect of the present disclosure, a mechanism is provided for reabsorption of aqueous humor that has been expelled from the AC of the eye 10 to reduce or otherwise stabilize intraocular pressure. One skilled in the art, however, will appreciate that aspects of the present disclosure are useful in other applications where drainage of biological fluid to be redirected in the body is desired.

FIGS. 1A and 2-7 illustrate different features of the shunt device or glaucoma drainage device 100 for treating glaucoma according to some embodiments. The shunt device 100 is an implantable device which, when implanted at least in part within the tissue of an eye, can be used for draining biological fluid from the eye to a tissue surrounding the eye. The shunt device 100 has a primary tube 102 having a first length L1 (also referred to as a "total length," or "untrimmed length" if referring to the length before the tube is trimmed), a secondary tube 104 having a second length L2, and a shunt body 106. The primary tube has a primary proximal end 108, a primary distal end 110, and a primary conduit 112 which extends between the two ends. The secondary tube 104 has a secondary proximal end 114, a secondary distal end 116, and a secondary conduit 118 that extends between the two ends. The shunt body 106 has a reservoir 120 therein. The shunt body 106 is integrated with the primary tube 102 near the primary distal end 110 such that the primary and secondary conduits 112, 118 are fluidly coupled with the reservoir 120.

It is to be understood that the terms "proximal" and "distal" are used hereinafter with respect to the perspective of a doctor or surgeon who is performing the procedure to implant the shunt device into the tissue of the eye of a patient. In various examples, the shunt device is implanted by inserting the end with the shunt body into an incision made in the tissue of the eye, after which the opposing end of the tube is inserted into another portion of the eye, such as inside the AC to drain fluid therefrom. For this reason, the shunt body may be referred to as more distal from the practitioner with respect to the end of the tube which protrudes from the shunt body.

Figure 1D:
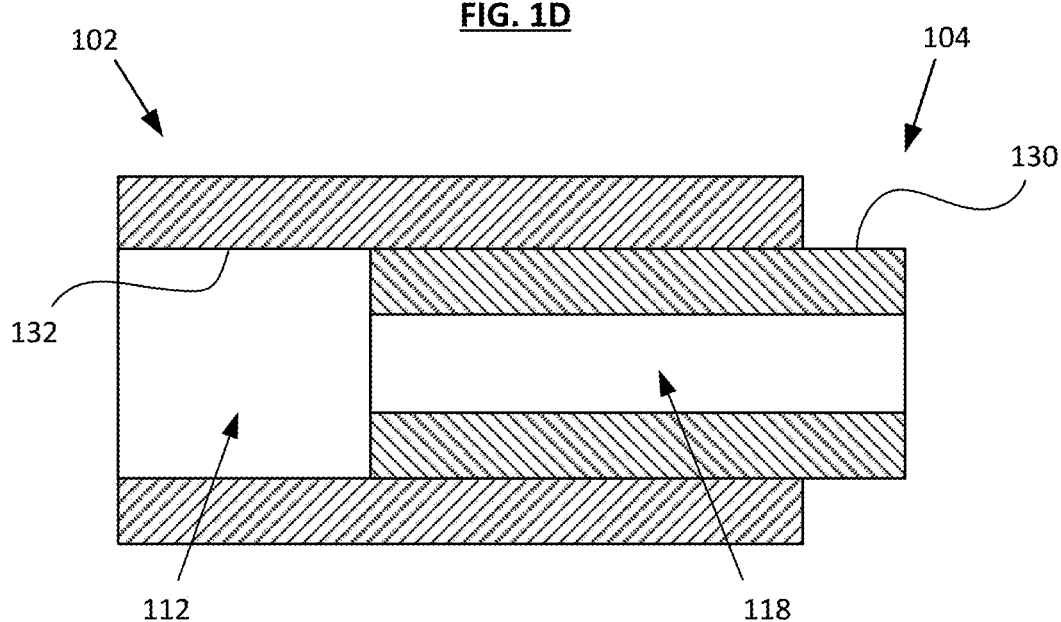
FIG. 1D is a cross-sectional view of a portion of the tubes extending from the glaucoma shunt device according to an embodiment disclosed herein.
Figure 1E:
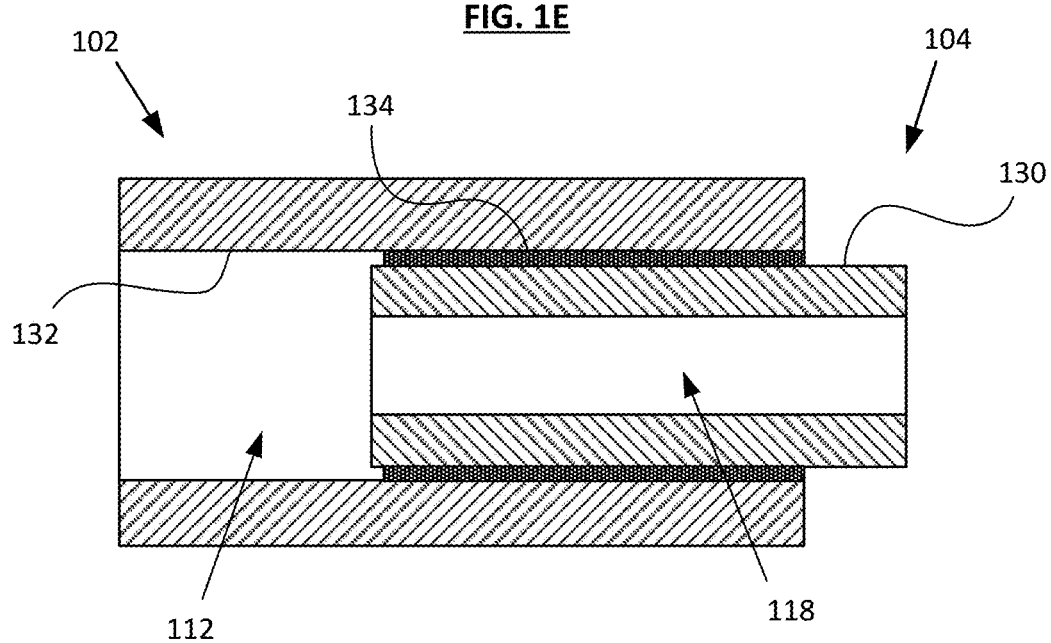
FIG. 1E is a cross-sectional view of a portion of the tubes extending from the glaucoma shunt device according to another embodiment disclosed herein.

In some embodiments, the secondary tube 104 is at least partially inserted through the primary conduit 112 via the primary distal end 110, as shown in FIGS. 1D and 1E. When viewed from the primary proximal end 108, as shown in FIG. 1B, it is observed that the secondary conduit 118 as defined by the secondary tube 104 has a narrower diameter, or D2, than the primary conduit 112 defined by the primary tube 102, whose inner diameter is D1. As such, the secondary tube 104 defines a flow resistance of both the primary and secondary tubes.

Once implanted in the tissue of the eye, fluid from the environment is allowed to flow into the primary conduit 112 from the primary proximal end 108, pass through the primary conduit 112 and then the secondary conduit 118, and finally exit the tubes via the secondary distal end 116, as shown by the broken arrows drawn in FIG. 1A. Because the exit (the secondary distal end 116, with the diameter D2) has a conduit diameter that is smaller than the entrance (the primary proximal end 108, with the diameter D1), the resistance to the flow of the fluid through the tubes and into the reservoir 120 is primarily determined by the smaller diameter D2 of the secondary conduit 118. As such, the diameter of the secondary conduit is a primary determinant of a flow resistance of fluid entering the reservoir. In some examples, a length (L2) of the secondary conduit may be a secondary determinant of a flow resistance of fluid entering the reservoir. The flow resistance as determined is maintained both during implantation of the shunt device 100 and after the implantation, such that the flow resistance remains substantially constant throughout the use of the shunt device.

A primary determinant is defined as having a greater effect on determining a value of the flow resistance than a secondary determinant. Such determinants are defined in view of the Hagen-Poiseuille equation:

$$\frac{\Delta p}{Q} = \frac{8\mu L}{\pi R^4} \qquad \text{(Equation 1)}$$

where $\Delta p$ is the pressure difference between the two ends of a conduit when liquid is passing through the conduit, $\mu$ is the dynamic viscosity, L is the length of the conduit, Q is the volumetric flow rate, and R is the radius of the conduit. The flow resistance is defined as $\Delta p/Q$. As such, it can be observed from Equation 1 that a change in radius (and diameter) of the conduit's end portion from which the liquid exits has a greater effect (fourth power) on the flow rate (Q) than a change in the length of the conduit (first power).

In some examples, the secondary tube 104 is permanently attached to the primary tube 102. As shown in FIGS. 1D and 1E, permanent attachment between the secondary tube 104 and the primary tube 102 includes attachment between an outer surface 130 of the secondary tube 104 and an inner surface 132 of the primary conduit 112 or primary tube 102. In FIG. 1D, the friction caused between the outer surface 130 and the inner surface 132 alone is capable of permanently attaching the two tubes together (via friction fit). In FIG. 1E, another component such as any suitable adhesive 134 such as an adhesive polymer material may be disposed between the outer surface 130 and the inner surface 132 to facilitate the permanent attachment. Once they are permanently attached, the tubes 102 and 104 are prevented from sliding relative to each other.

In some embodiments, the primary tube 102 has a portion which does not overlap with the secondary tube 104, and the portion is referred to as a trimmable portion 122. The trimmable portion 122 extends proximally with respect to the secondary proximal end 114 and is named as such because the length of the primary tube 102 may be adjusted by trimming or cutting the primary tube at the trimmable portion without affecting the flow resistance of the tubes. In various examples, regardless of where the primary tube 102 is cut or trimmed along the trimmable portion 122 to shorten the length L1 of the primary tube, the resulting tube (with a shorter length L1) would have the same flow resistance therethrough as before the cut or trim. In some examples, the secondary conduit maintains a constant flow rate therethrough before and after the primary tube is shortened.

As shown, the shunt body 106 includes, in addition to the reservoir 120, a neck portion 124 which is the portion of the shunt body 106 that comes into contact with the primary tube 102. The neck portion 124 may be a portion of the shunt body 106 which extends proximally by a predetermined distance. In some examples, the neck portion 124 may be an elongated, rectangular, continuous extension from the shunt body 106. The neck portion 124 may have sufficient width and length to provide a structural support for the primary tube 102 which is at least partially affixed or attached at the neck portion 124. The primary tube 102 may be attached to the neck portion 124 in one of different configurations as explained herein with respect to FIGS. 1A and 2-7.

In FIG. 1A, the primary tube 102 is attached to the neck portion 124 such that the primary distal end 110 of the primary tube is located at the neck portion. That is, the primary distal end of the primary tube is located between a proximal end 126 and a distal end 128 of the neck portion. The neck portion has a length (Ln) defined by the proximal and distal ends 126, 128, and it is within this length that the primary distal end 110 is positioned. The secondary distal end 116 extends distally with respect to the primary distal end 110 such that the secondary distal end extends into and is positioned within the reservoir 120 so as to facilitate the fluid flow thereinto, as shown by the dotted arrows extending from the secondary distal end. The secondary proximal end 114 of the secondary tube 104 is positioned proximally with respect to the neck portion 124.

In FIG. 2, the primary tube 102 is attached to the neck portion 124 such that the primary distal end 110 of the primary tube 102 extends distally beyond the neck portion 124 such that both the primary distal end 110 of the primary tube 102 and the secondary distal end 116 of the secondary tube 104 are positioned within the reservoir 120. The secondary proximal end 114 of the secondary tube 104 is positioned proximally with respect to the neck portion 124.

In FIG. 3, the primary tube 102 is attached to the neck portion 124 such that the primary distal end 110 of the primary tube 102 and the secondary distal end 116 of the secondary tube 104 are both positioned at or within the neck portion 124. That is, the location of the primary and secondary distal ends 110 and 116 may be at or within the length Ln of the neck portion 124. The secondary proximal end 114 of the secondary tube 104 is positioned proximally with respect to the neck portion 124, and the secondary distal end 116 is positioned proximally with respect to the primary distal end 110 of the primary tube. Therefore, the primary conduit 112 extends both distally and proximally with respect to the secondary conduit 118.

In FIG. 4, the primary tube 102 is attached to the neck portion 124 such that the primary distal end 110 of the primary tube 102 is positioned at or within the neck portion 124, and the secondary distal end 116 of the secondary tube 104 is positioned proximally with respect to the neck portion 124. The secondary proximal end 114 and the secondary distal end 116 of the secondary tube 104 are both positioned proximally with respect to the neck portion 124, and the secondary distal end 116 is positioned proximally with respect to the primary distal end 110 of the primary tube. Therefore, the primary conduit 112 extends both distally and proximally with respect to the secondary conduit 118.

In FIG. 5, the primary tube 102 is attached to the neck portion 124 such that the primary distal end 110 of the primary tube 102 is positioned distally beyond the neck portion 124 and into the reservoir 120, and the secondary distal end 116 of the secondary tube 104 is positioned at or within the neck portion 124. The secondary proximal end 114 of the secondary tube 104 is positioned proximally with respect to the neck portion 124, and the secondary distal end 116 is positioned proximally with respect to the primary distal end 110 of the primary tube 102. Therefore, the primary conduit 112 extends both distally and proximally with respect to the secondary conduit 118.

In FIG. 6, the primary tube 102 is attached to the neck portion 124 such that the primary distal end 110 of the primary tube 102 is positioned distally beyond the neck portion 124 and into the reservoir 120, and the secondary distal end 116 of the secondary tube 104 is positioned proximally with respect to the neck portion 124. As such, the neck portion 124 is disposed or positioned between the primary distal end 110 and the secondary distal end 116. The secondary proximal end 114 of the secondary tube 104 is positioned proximally with respect to the neck portion 124, and the secondary distal end 116 is positioned proximally with respect to the primary distal end 110 of the primary tube 102. Therefore, the primary conduit 112 extends both distally and proximally with respect to the secondary conduit 118.

In the examples of FIGS. 3-6, the flow resistance decreases between the secondary distal end 116 of the secondary tube 104 (where the flow resistance is increased with respect to the primary proximal end 108 of the primary tube 102) and the primary distal end 110 of the primary tube 102.

In FIG. 7, the primary tube 102 is attached to the neck portion 124 such that the primary distal end 110 of the primary tube and the secondary distal end 116 of the secondary tube 104 are both positioned at or within the neck portion 124. The secondary proximal end 114 of the secondary tube is also positioned at or within the neck portion 124 such that the entirety of the secondary tube is positioned or disposed at or within the neck portion 124. That is, the length L2 may be described by the following mathematical expression: L2 Ln.

FIGS. 8A and 9-13 illustrate different examples of the shunt device 100 or glaucoma drainage device 100 for treating glaucoma according to some embodiments. The shunt device 100 has a tube 800 having a length L3 (also referred to as a "total length," or "untrimmed length" if referring to the length before the tube is trimmed) defined as the length of the tube between a proximal end 812 and a distal end 814. The tube 800 has a primary portion 802 with a primary conduit 804 and a secondary portion 806 with a secondary conduit 808. The primary portion 802 is positioned proximally with respect to the secondary portion 806, and the secondary conduit 808 has a flow resistance. The shunt body 106 of the shunt device has a reservoir 120 therein, and the shunt body is integrated with the tube 800 at the secondary portion 806 such that the primary and secondary conduits 804, 808 are fluidly coupled with the reservoir 120.

When viewed from the proximal end 812 of the tube 800, as shown in FIG. 8B, it is observed that the secondary conduit 808 defined by the secondary portion 806 of the tube has a narrower diameter, or D2, than the primary conduit 804 defined by the primary portion 802 of the tube, whose inner diameter is D1. As such, the secondary portion 806 defines a flow resistance of the entire tube 800.

The tube 800 has a length L3 which includes both lengths of the primary portion 802 and the secondary portion 806. The secondary portion 806 has a length (L4) which is less than the length L3 and defines a distal portion of the tube 800 with respect to the primary portion 802. The tube also includes an intermediate or transitional portion 810 positioned between the primary portion 802 and the secondary portion 806 to define a transition from the primary conduit 804 with the diameter D1 to the secondary conduit 808 with the diameter D2.

Once implanted in the tissue of the eye, fluid from the environment is allowed to flow into the primary conduit 804 from the proximal end 812, pass through the primary conduit 804 and then the secondary conduit 808, and finally exit the tube 800 via the distal end 814, as shown by the broken arrows drawn in FIG. 8A. Because secondary conduit 808 has a conduit diameter that is smaller than the primary conduit 804, the resistance to the flow of the fluid through the tube 800 and into the reservoir 120 is primarily determined by the smaller diameter D2 of the secondary conduit 808. As such, the diameter of the secondary conduit is a primary determinant of a flow resistance of fluid entering the reservoir. In some examples, the length L4 of the secondary conduit 808 may be a secondary determinant of a flow resistance of fluid entering the reservoir 120.

The tube 800 has a portion extending proximally with respect to the secondary portion 806, referred to as the trimmable portion 122. The trimmable portion 122 is named as such because the length of the tube 800 may be adjusted by trimming or cutting the tube at the trimmable portion without affecting the flow resistance of the tube. That is, regardless of where the tube is cut or trimmed along the trimmable portion 122 to shorten the length L3 of the tube, the resulting tube (with a shorter length L3) would have the same flow resistance therethrough as before the cut or trim. In some examples, the secondary conduit maintains a constant flow rate therethrough before and after the tube is shortened.

The shunt body 106 includes, in addition to the reservoir 120, the neck portion 124 which is the portion of the shunt body that comes into contact with the tube 800. The tube 800 may be attached to the neck portion in one of different configurations as explained herein with respect to FIGS. 8A and 9-13.

In FIG. 8A, the tube 800 is attached to the neck portion 124 such that the distal end 814 of the tube is positioned distally beyond the neck portion and extends into the reservoir 120 so as to facilitate the fluid flow thereinto, as shown by the dotted arrows extending from the distal end. The neck portion has a length (Ln) defined by the proximal and distal ends 126, 128. The transitional portion 810 defining the transition from the primary conduit 804 to the secondary conduit 808 is positioned proximally with respect to the neck portion 124.

Figure 9:
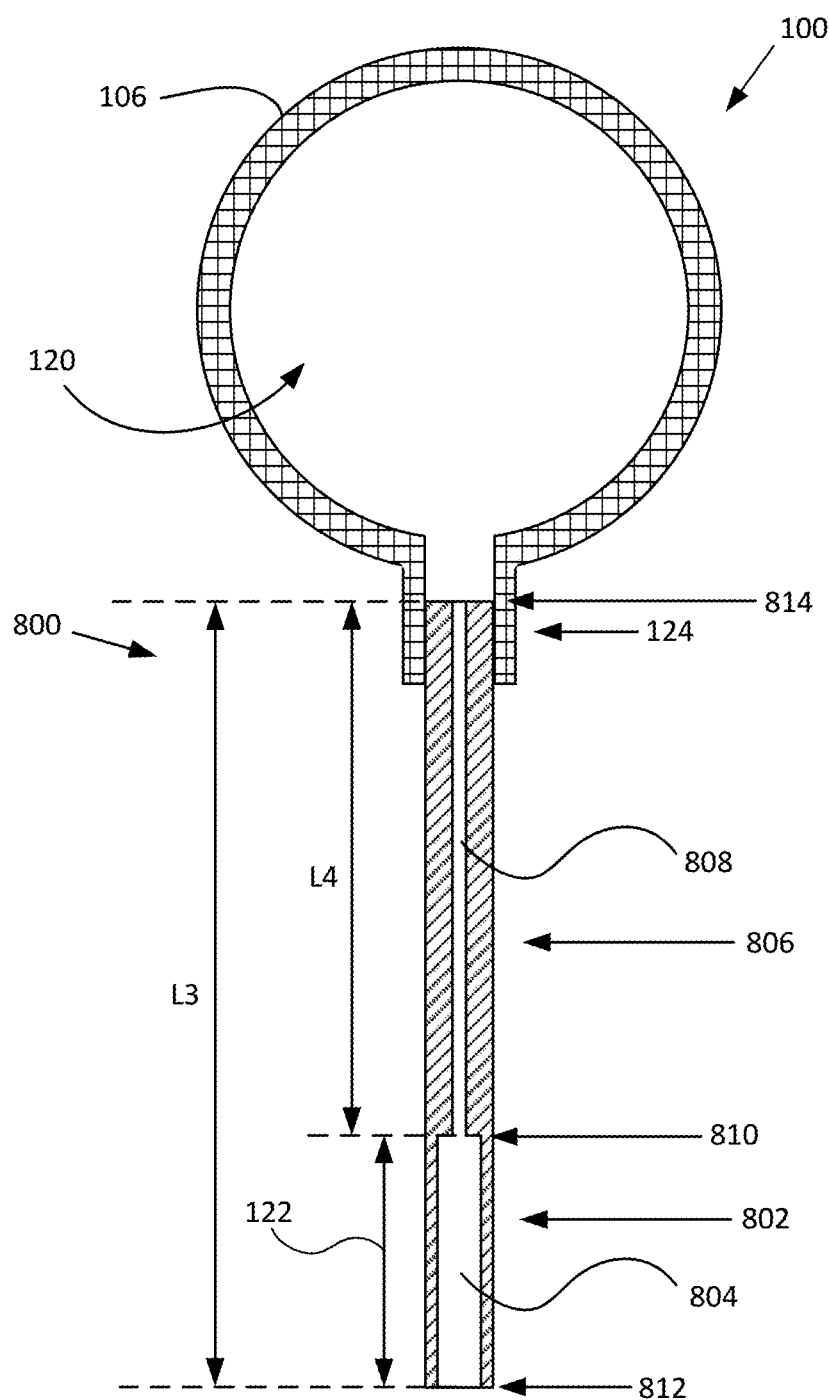

In FIG. 9, the tube 800 is attached to the neck portion 124 such that the distal end 814 of the tube is positioned at or within the neck portion, and the transitional portion 810 is positioned proximally with respect to the neck portion 124.

Figure 10:
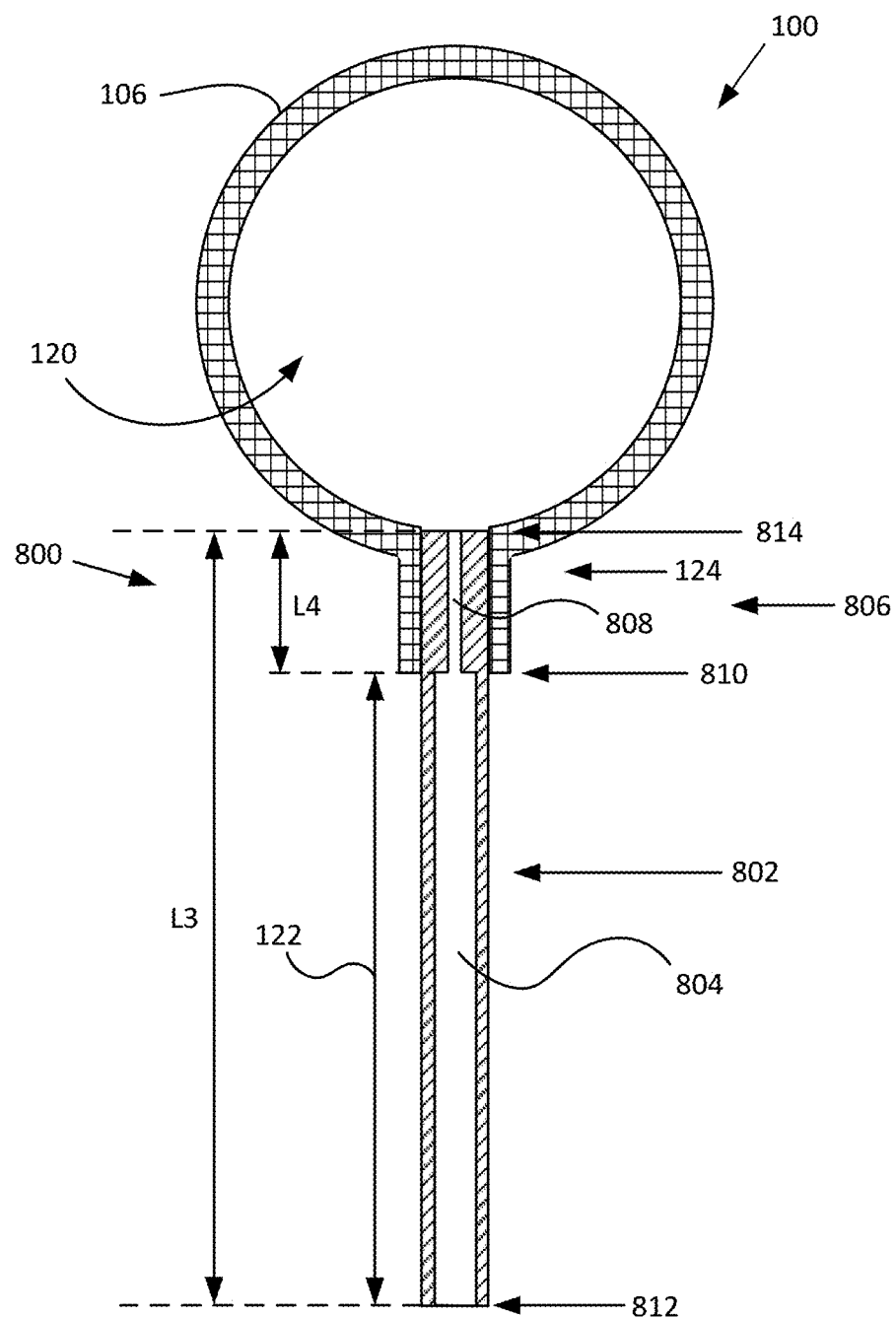

In FIG. 10, the tube 800 is attached to the neck portion 124 such that both the distal end 814 and the transitional portion 810 of the tube are positioned at or within the neck portion 124 such that the entirety of the secondary portion 806 is disposed at or within the neck portion 124. That is, the length L4 may be described by the following mathematical expression: L4≤Ln (which includes L4=Ln as per the example shown).

Figure 11:
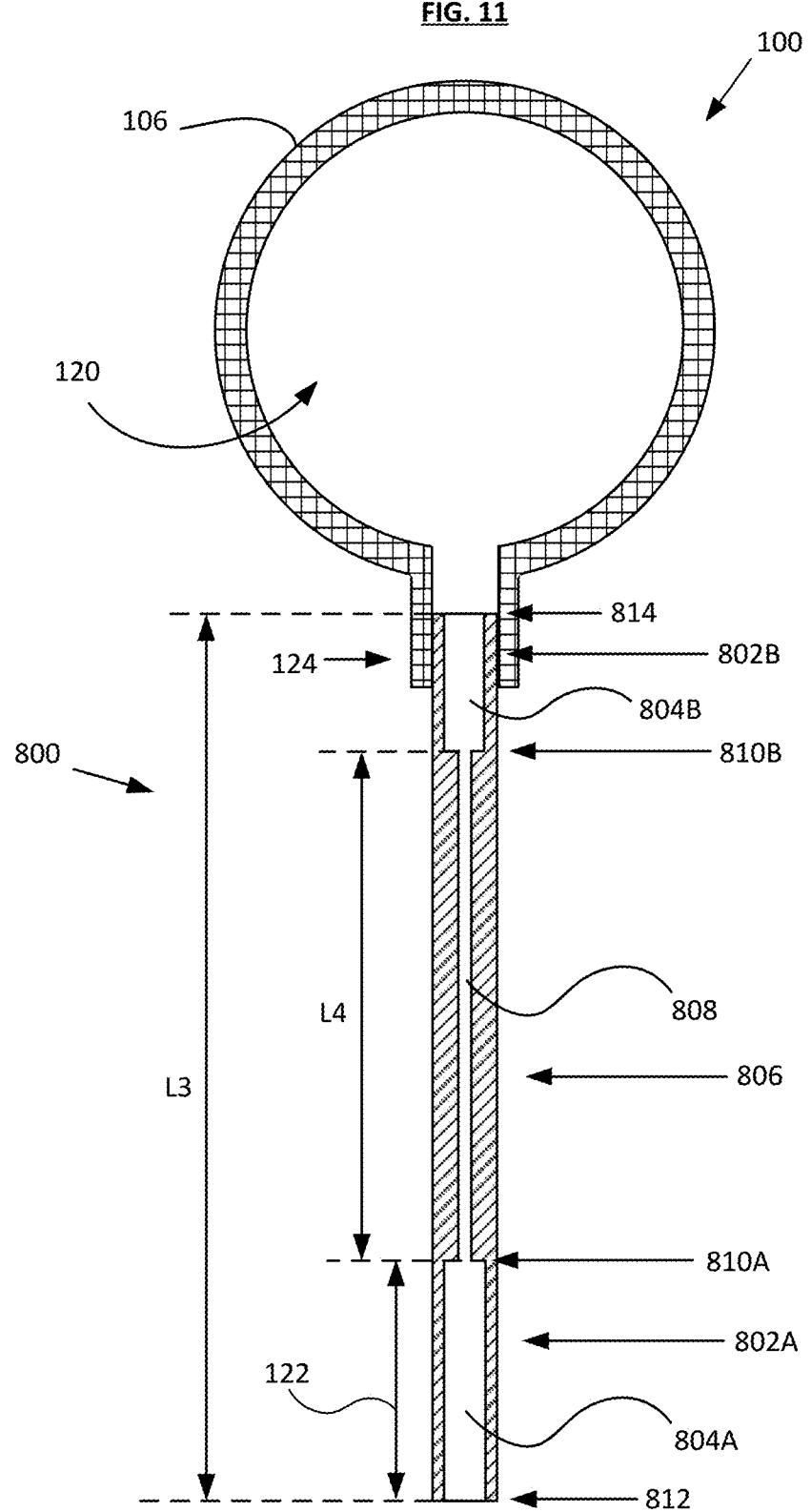

In the examples shown in FIGS. 11-13, the shunt device 100 includes two transitional portions 810A, 810B and two primary portions 802A, 802B defining two primary conduits 804A, 804B positioned on the two opposing ends of the secondary portion 806. In these figures, the tube 800 includes a proximal primary portion 802A positioned proximally with respect to the secondary portion 806 and partially defining the proximal primary conduit 804A, and a distal primary portion 802B positioned distally with respect to the secondary portion 806 and partially defining the distal primary conduit 804B. The first transitional portion 810A is positioned between the proximal primary portion 802A and the secondary portion 806, and the second transitional portion 810B is positioned between the distal primary portion 802B and the secondary portion 806. The second transitional portion 810B is positioned distally with respect to the first transitional portion 810A, and the locations of the transitional portions 810A, 810B differ in the various configurations disclosed herein.

In FIG. 11, the tube 800 is attached to the neck portion 124 such that the distal end 814 of the tube is positioned at or within the neck portion 124, and both of the transitional portions 810A, 810B are positioned proximally with respect to the neck portion 124. Therefore, the distal primary conduit 804B is partially disposed within the neck portion 124.

In FIG. 12, the tube 800 is attached to the neck portion 124 such that the distal end 814 of the tube extends distally with respect to the neck portion 124 and into the reservoir 120. The transitional portion 810B is positioned at or within the neck portion 124, and the other transitional portion 810B is positioned proximally with respect to the neck portion 124. Therefore, the secondary conduit 808 and the distal primary conduit 804B are partially disposed within the neck portion 124.

In FIG. 13, the tube 800 is attached to the neck portion 124 such that the distal end 814 of the tube extends distally with respect to the neck portion 124 and into the reservoir 120. Both of the transitional portions 810A, 810B are positioned proximally with respect to the neck portion 124. Therefore, the neck portion 124 is positioned between the distal end 814 of the tube 800 and the second transitional portion 810B such that the distal primary conduit 804B extends through the entire length Ln of the neck portion 124.

In the examples of FIGS. 11-13, the flow resistance decreases between the second transitional portion 810B of the tube 800 (where the flow resistance is increased with respect to the proximal end 812 of the tube 800) and the distal end 814 of the tube 800.

FIGS. 14A and 14B illustrate two examples of the transitional portion 810 as disclosed herein. It is to be noted that the transitional portion may be defined as the portion of the tube 800 where the primary conduit 804 transitions to the secondary conduit 808, or vice versa where the secondary conduit 808 transitions to the primary conduit 804 (e.g., the transitional portion 810B in FIGS. 11-13). In the latter, the configuration of the transitional portion 810 is understood as the same as FIGS. 14A and 14B but flipped vertically (or rotated 180 degrees).

In FIG. 14A, the transitional portion 810 has corners or edges 1400 such that the fluid, once inside the primary conduit 804 of a wider diameter, circumvents the edges 1400 to flow into the secondary conduit 808 of a narrower diameter. In FIG. 14B, instead of the corners or edges, the transitional portion 810 has a funnel 1402 which gradually reduces the diameter of the conduit. This transitions from the wider diameter of the primary conduit 804 to the narrower diameter of the secondary conduit 808 over a predetermined distance (T), which provides for a smoother transition from one to the other (e.g., as opposed to a sharp transition). Although not illustrated, the transitional portion may be more curved or implements a more complex shape or configuration than those as shown, such as a stepped configuration with a plurality of individual transitional portions positioned next to each other, for example.

Further disclosed herein is a first type of methods, which are methods of draining the biological fluid from the human eye via the tube(s) extending from the shunt body 106 of the glaucoma shunt device 100. The shunt device 100 may have a plurality of tubes (primary and secondary tubes 102, 104) or a single tube (tube 800) with (1) a proximal end (e.g., 108 or 812) disposed within the human eye to receive the biological fluid and (2) a distal end (e.g., 110, 116, or 814) which engages the shunt body 106 to fluidically connect the proximal end to the reservoir 120 disposed within the shunt body 106. Once disposed at the suitable location, the biological fluid is channeled through the tube(s) at a first flow resistance at the proximal end of the tube(s), channeled through the tube(s) at a second flow resistance between the proximal end and the distal end of the tube(s), and channeled from the distal end of the tube(s) into the reservoir 120.

Additionally, a second type of methods of reducing a fluid pressure in the human eye to lessen a risk of hypotony are disclosed herein. In such methods, the fluid within the eye is directed into the proximal end (e.g., 108 or 812) of the tube(s) (e.g., primary and secondary tubes 102, 104 or the single tube 800) such that the tube(s) at or near the proximal end (e.g., 108 or 812) has a first flow resistance. The fluid is subsequently directed into a portion of the tube(s) with a second flow resistance that is greater than the first flow resistance at or near the proximal end. The fluid is then subsequently directed from the distal end (e.g., 110, 116, or 814) of the tube(s) into the reservoir 120, resulting in a reduced fluid pressure within the eye.

With respect to either one of the two aforementioned types of methods, the proximal end (e.g., 108 or 812) of the tube(s) (e.g., the combination of the primary and secondary tubes 102, 104 or the singular tube 800) may be trimmed to reduce a length of the tube(s) while maintaining the second flow resistance. In some examples, the length may refer to an entire length of the singular tube 800 or a total/combined length of the coupled tubes 102 and 104 which operate as a single tube. In some examples, the first and second flow resistances define a combined tube flow resistance, where the proximal end of the tube(s) may be trimmed to reduce the length (e.g., the entire or total/combined length) of the tube(s) while maintaining the combined tube flow resistance. As defined herein, a combined tube flow resistance may be represented as a sum of the first and second flow resistances.

In some examples of the methods, the distal end (e.g., 110, 116, or 814) of the tube(s) (e.g., the combination of the primary and secondary tubes 102, 104 or the singular tube 800) may be disposed or otherwise positioned to extend into the reservoir 120. In some examples, the methods may include subsequently directing the fluid into another portion of the tube(s) having a third flow resistance that is less than the second flow resistance, immediately after subsequently directing the fluid into a portion of the tube(s) having the second flow resistance.

Further disclosed herein is a third type of methods, which are methods of reducing a fluid pressure in a human eye to lessen a risk of hypotony, a condition of an undesirably low intraocular pressure in the AC of the eye caused by a flow rate of the fluid from the AC of the eye being greater than a production rate of the fluid in the AC, which may cause blurred vision, collapse of the AC, or other damage to the eye. The fluid within the eye is directed through a proximal end (e.g., 108 or 812) of the tube(s) (e.g., the combination of the primary and secondary tubes 102, 104 or the singular tube 800) and into the reservoir 120 disposed at a different position relative to the proximal end of the tube(s).

A flow resistance of the tube(s) increases between the proximal end and the distal end (e.g., 110, 116, or 814) of the tube(s) as disposed adjacent to the reservoir 120, in order to limit a flow through the tube(s) that is sufficient enough to lessen the risk of hypotony. The increase of the flow resistance may occur between the proximal end and the distal end of the tube(s). In some examples, the proximal end of the tube(s) may be trimmed to reduce a length (that is, entire or total/combined length) of the tube(s) while maintaining the flow resistance therethrough. In some examples, the distal end of the tube(s) may be disposed to extend into the reservoir 120. In some examples, the flow resistance may decrease between the flow resistance increase, that is, the portion of the tube(s) where the flow resistance increases, and the distal end of the tube(s).

Also disclosed are methods of forming the drainage device 100 that are implantable at least in part within the tissue of the eye. In some configurations, the method includes: forming a shunt body 106 with a reservoir 120 defined therein, the reservoir being configured to receive and accumulate biological fluid; preparing a primary tube 102 having a primary proximal end 108, a primary distal end 110, and a primary conduit 112 extending therebetween, and a secondary tube 104 having a secondary proximal end 114, a secondary distal end 116, and a secondary conduit 118 extending therebetween and having a flow resistance; at least partially inserting the secondary tube 104 through the primary conduit 112 via the primary distal end 110; and integrating the shunt body 106 with the primary tube 102 near the primary distal end 110 such that the primary and secondary conduits 112,118 are fluidly coupled with the reservoir 120 and the primary proximal end 108 of the primary tube 102 is deliverable into the eye to facilitate drainage of the biological fluid into the primary conduit 112.

The method may include: permanently attaching the secondary tube to the primary tube; disposing an adhesive 134 between an outer surface of the secondary tube and an inner surface of the primary conduit prior to at least partially inserting the secondary tube through the primary conduit via the primary distal end; positioning the secondary distal end to extend distally beyond the primary distal end and into the reservoir; permanently attaching the primary tube to the shunt body at or near the primary distal end; positioning the primary proximal end to extend proximally beyond the secondary proximal end by a predetermined length, such that a total length of the primary tube is capable of being shortened by cutting the primary tube along a section extending proximally beyond the secondary tube, without affecting the flow resistance of the secondary conduit; maintaining, by the secondary conduit, a constant flow rate through the secondary conduit before and after the shortening of the primary tube; and/or forming the secondary tube such that the secondary conduit has a smaller diameter than the primary conduit, and the diameter of the secondary conduit is a primary determinant of a flow resistance of fluid entering the reservoir, where a length of the secondary conduit may be a secondary determinant of a flow resistance of fluid entering the reservoir.

In some configurations, the method includes: forming a shunt body 106 with a reservoir 120 defined therein, the reservoir being configured to receive and accumulate biological fluid; preparing a tube 800 having a primary portion 802 with a primary conduit 804 and a secondary portion 806 with a secondary conduit 808, the primary conduit 804 having a primary diameter greater than a secondary diameter of the secondary conduit 808, the primary portion 802 positioned proximally with respect to the secondary portion 806, and the secondary conduit 808 having a flow resistance; and integrating the shunt body 106 with the tube 800 at the secondary portion 806 such that the primary and secondary conduits 804, 808 are fluidly coupled with the reservoir 120 and the primary portion 802 of the tube 800 is deliverable into the eye to facilitate drainage of the biological fluid into the primary conduit 804.

The method may also include: distally extending the secondary portion of the tube at least partially into the reservoir; forming the tube such that the primary portion extends proximally with respect to the secondary portion by a predetermined length, and a total length of the primary portion is capable of being shortened by cutting the primary portion of the tube along a section extending proximally beyond the secondary portion, without affecting the flow resistance of the secondary conduit; maintaining, by the secondary portion, a constant flow rate through the secondary conduit before and after the shortening of the primary portion of the tube; and/or forming the tube such that the secondary conduit has a smaller diameter than the primary conduit, and the diameter of the secondary conduit is a primary determinant of a flow resistance of fluid entering the reservoir, where a length of the secondary conduit may be a secondary determinant of a flow resistance of fluid entering the reservoir.

The presence of a trimmable portion along the length of the tube allows the tube to be trimmed without affecting the flow resistance therein. Therefore, the trimmable portion beneficially contributes to the adjustability of the shunt device placement in a given patient's anatomy, allowing the doctor or surgeon who is using the shunt device to freely trim the tube to adjust tube length as suitable for safe placement, both with regards to the placement of the tube inside the patient's anterior chamber and with regards to the placement of the reservoir of the shunt device on the surface of the sclera and under the conjunctiva.

Furthermore, the shunt body that is physically and functionally coupled with the tube(s) advantageously provides a means for storing and controllably releasing the fluid directed into the tube(s) in the form of a reservoir defined by the shunt body. The neck portion of the shunt body also beneficially provides structural support for the tube(s) to be attached to the shunt body without negatively affecting the flow resistance of the tube(s).

Material selection of the shunt device, including the shunt body, may include biocompatible materials, including microporous materials such as expanded polytetrafluoroethylene (ePTFE) as discussed below. The tube(s) may be made of materials including biocompatible materials that are flexible and suitable for use in constructing elongate members. Some such suitable materials may include, but are not limited to, fluorosilicone, polytetrafluoroethylene, perfluorovinylethers (PAVEs), polypropylene, thermoplastic polyurethanes, silicone, styrenic block copolymers, polyether block amide, or polyolefin elastomers, for example, as well as any suitable combinations thereof. In some examples, the suitable material may also include metal. In certain instances, the shunt material, including the shunt body, may include a fluoropolymer, such as a polytetrafluoroethylene (PTFE) polymer or an ePTFE polymer, or any suitable combination thereof, for example. In some instances, the material may include, but is not limited to, a polyester such as Dacron, a silicone, a polyurethane, a carboxy methylcellulose fabric, or another biocompatible polymer, or any suitable combinations thereof, for example. Various modifications and additions can be made to the embodiments disclosed herein without departing from the scope of the disclosure. For example, while the embodiments described above refer to particular features, the scope of this disclosure also includes embodiments having different combinations of features and embodiments that do not include all of the described features. Thus, the scope of the present disclosure is intended to embrace all such alternatives, modifications, and variations as fall within the scope of the claims, together with all equivalents.

The foregoing discussion has been presented for purposes of illustration and description. The foregoing is not intended to limit the disclosure to the form or forms disclosed herein. In the foregoing Summary for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, for example, as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A glaucoma shunt device for draining a biological fluid from an eye, the glaucoma shunt comprising:
   a tube comprising a primary portion with a primary conduit and a secondary portion with a secondary conduit, a transitional portion positioned between the primary portion and the secondary portion, the primary conduit having a primary diameter greater than a secondary diameter of the secondary conduit, the primary portion positioned proximally with respect to the secondary portion, and the secondary conduit having a flow resistance; and a shunt body having a reservoir therein and being integrated with the tube at the secondary portion such that the primary and secondary conduits are fluidly coupled with the reservoir.

2. The glaucoma shunt device of claim 1, wherein the tube is attached to the shunt body at a neck portion of the shunt body.

3. The glaucoma shunt device of claim 2, wherein the secondary distal end is positioned at the neck portion of the shunt body.

4. The glaucoma shunt device of claim 3, wherein the primary tube is permanently attached to the shunt body at or near the secondary distal end.

5. The glaucoma shunt device of claim 2, wherein a secondary distal end is positioned proximally with respect to the neck portion.

6. The glaucoma shunt device of claim 2, wherein the secondary portion is entirely disposed at or within the neck portion.

7. The glaucoma shunt device of claim 1, wherein the primary portion defines a trimmable portion of the tube, wherein a total length of the primary portion defines a first state of the tube that is untrimmed and further defines a second state of the combined primary and secondary tubes tube that is trimmed to a shorter length of the trimmable portion, the first state and the second state both having the same flow resistances.

8. The glaucoma shunt device of claim 7, wherein the secondary conduit maintains a constant flow rate therethrough before and after the primary portion is shortened.

9. The glaucoma shunt device of claim 1, wherein the flow resistance of the secondary conduit is a primary determinant of a flow resistance of fluid entering the reservoir.

10. The glaucoma shunt device of claim 1, wherein a length of the secondary conduit is a secondary determinant of a flow resistance of fluid entering the reservoir.

11. The glaucoma shunt device of claim 1, wherein the transitional portion comprises a funnel shape that gradually reduces the diameter from the primary diameter to the secondary diameter.

12. The glaucoma shunt device of claim 1, wherein the transitional portion comprises one or more edges defining a step transition from the primary diameter to the secondary diameter.

13. The glaucoma shunt device of claim 1, wherein the tube further comprises:
a distal tertiary portion positioned distally with respect to the secondary portion and defining a tertiary conduit; and
a second transitional portion positioned between the secondary portion and the tertiary portion.

14. A glaucoma shunt device for draining a biological fluid from an eye, the glaucoma shunt comprising:
a tube comprising a primary portion with a primary conduit and a secondary portion with a secondary conduit, a first transitional portion positioned between the primary portion and the secondary portion, the primary conduit having a primary diameter greater than a secondary diameter of the secondary conduit, the primary portion positioned proximally with respect to the secondary portion, and the secondary conduit having a flow resistance; and
a shunt body having a reservoir therein and a neck portion, the shunt body integrated with the tube at the secondary portion such that the primary and secondary conduits are fluidly coupled with the reservoir.

15. The glaucoma shunt device of claim 14, wherein a section of the secondary portion extends distally into the reservoir.

16. The glaucoma shunt device of claim 15, wherein the tube is attached to the shunt body at the neck portion of the shunt body.

17. The glaucoma shunt device of claim 16, wherein a distal end of the tube is positioned at the neck portion of the shunt body.

18. The glaucoma shunt device of claim 16, wherein the secondary portion of the tube is entirely disposed at or within the neck portion.

19. The glaucoma shunt device of claim 16, wherein the tube further comprises:
a distal tertiary portion positioned distally with respect to the secondary portion and defining a tertiary conduit; and
a second transitional portion positioned between the secondary portion and the tertiary portion.

20. The glaucoma shunt device of claim 19, wherein a distal end of the tube is positioned at the neck portion of the shunt body, and the first and second transitional portions are both positioned proximally with respect to the neck portion.

21. The glaucoma shunt device of claim 19, wherein a distal end of the tube extends distally beyond the neck portion of the shunt body and into the reservoir, the second transitional portion is positioned at the neck portion, and the first transitional portion is positioned proximally with respect to the neck portion.

22. The glaucoma shunt device of claim 19, wherein a distal end of the tube extends distally beyond the neck portion of the shunt body and into the reservoir, and the first and second transitional portions are both positioned proximally with respect to the neck portion.

23. The glaucoma shunt device of claim 14, wherein the primary portion extends proximally with respect to the secondary portion by a predetermined length, such that a total length of the tube is capable of being shortened by cutting the primary portion of the tube along a section extending proximally beyond the secondary portion, without affecting the flow resistance of the secondary conduit.

24. The glaucoma shunt device of claim 23, wherein the secondary conduit maintains a constant flow rate therethrough before and after the primary portion of the tube is shortened.

25. The glaucoma shunt device of claim 14, wherein the secondary conduit has a smaller diameter than the primary conduit such that the diameter of the secondary conduit is a primary determinant of a flow resistance of fluid entering the reservoir.

26. The glaucoma shunt device of claim 14, wherein a length of the secondary conduit is a secondary determinant of a flow resistance of fluid entering the reservoir.

27. The glaucoma shunt device of claim 14, wherein the first transitional portion comprises a funnel shape that gradually reduces the diameter from the primary diameter to the secondary diameter.

28. The glaucoma shunt device of claim 14, wherein the first transitional portion comprises one or more edges defining a step transition from the primary diameter to the secondary diameter.

* * * * *